(12) United States Patent
Taira et al.

(10) Patent No.: US 11,852,783 B2
(45) Date of Patent: Dec. 26, 2023

(54) OPTICAL FILM, OPTICAL LAMINATE, FUNCTIONAL GLASS, AND HEAD-UP DISPLAY

(71) Applicant: NIPPON KAYAKU KABUSHIKI KAISHA, Tokyo (JP)

(72) Inventors: Yoshihiko Taira, Tokyo (JP); Chihiro Takahashi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 17/651,596

(22) Filed: Feb. 18, 2022

(65) Prior Publication Data

US 2022/0171094 A1 Jun. 2, 2022

Related U.S. Application Data

(63) Continuation of application No. PCT/JP2020/030663, filed on Aug. 12, 2020.

(30) Foreign Application Priority Data

Aug. 23, 2019 (JP) ................. 2019-152428

(51) Int. Cl.
| | | |
|---|---|---|
| *G02B 1/04* | (2006.01) | |
| *B32B 17/08* | (2006.01) | |
| *B32B 17/10* | (2006.01) | |
| *C09D 4/06* | (2006.01) | |
| *C09D 129/14* | (2006.01) | |
| *C09D 133/14* | (2006.01) | |
| *G02B 5/30* | (2006.01) | |
| *G02B 27/01* | (2006.01) | |

(52) U.S. Cl.
CPC ................ *G02B 1/04* (2013.01); *B32B 17/08* (2013.01); *B32B 17/10036* (2013.01); *B32B 17/10605* (2013.01); *B32B 17/10761* (2013.01); *C09D 4/06* (2013.01); *C09D 129/14* (2013.01); *C09D 133/14* (2013.01); *G02B 5/3016* (2013.01); *G02B 27/0101* (2013.01); *B32B 2307/412* (2013.01); *B32B 2307/42* (2013.01)

(58) Field of Classification Search
CPC ....................................................... G02B 1/04
See application file for complete search history.

(56) References Cited

U.S. PATENT DOCUMENTS

| | | |
|---|---|---|
| 5,066,525 A | 11/1991 | Nakamachi et al. |
| 5,510,913 A | 4/1996 | Hashimoto et al. |
| (Continued) | | |

FOREIGN PATENT DOCUMENTS

| | | |
|---|---|---|
| EP | 3 441 803 A1 | 2/2019 |
| JP | 1990-099934 U | 8/1990 |
| (Continued) | | |

OTHER PUBLICATIONS

International Search Report for corresponding International Application No. PCT/JP2020/030663 dated Oct. 27, 2020.
(Continued)

*Primary Examiner* — Joseph L Williams
(74) *Attorney, Agent, or Firm* — Pearne & Gordon LLP

(57) ABSTRACT

The present disclosure relates to an optical film includes (A) an optical functional layer and (B) a block layer, and (B) the block layer has a cured product of a resin composition containing (B-1) a thermoplastic resin and (B-2) an ultraviolet curable resin.

14 Claims, 4 Drawing Sheets

(56) References Cited

U.S. PATENT DOCUMENTS

| | | | |
|---|---|---|---|
| 2004/0263736 | A1 | 12/2004 | Graham et al. |
| 2005/0078245 | A1 | 4/2005 | Sasaki et al. |
| 2008/0129073 | A1 | 6/2008 | Nishikawa |
| 2019/0030856 | A1 | 1/2019 | Hayasaki et al. |
| 2019/0391390 | A1 | 12/2019 | Tanaka et al. |

FOREIGN PATENT DOCUMENTS

| | | | |
|---|---|---|---|
| JP | 06-040271 | A | 2/1994 |
| JP | 9-005526 | A | 1/1997 |
| JP | 2002-090743 | A | 3/2002 |
| JP | 2003-0315556 | A | 11/2003 |
| JP | 2004-029824 | A | 1/2004 |
| JP | 2006-098466 | A | 4/2006 |
| JP | 2017-198981 | A | 11/2017 |
| WO | 2014/084044 | A1 | 6/2014 |
| WO | 2018/168726 | A1 | 9/2018 |

OTHER PUBLICATIONS

Written Opinion for corresponding International Application No. PCT/JP2020/030663 dated Oct. 27, 2020 and English translation.
Notice of Reasons for Refusal dated Apr. 2, 2021 for corresponding Japanese Application No. 2021-503624 and English translation.
Decision to Grant a Patent dated Aug. 17, 2021 for corresponding Japanese Application No. 2021-503624 and English translation.
Extended European Search Report dated Aug. 7, 2023 for corresponding European Application No. 20857085.3.

OPTICAL FILM, OPTICAL LAMINATE, FUNCTIONAL GLASS, AND HEAD-UP DISPLAY

CROSS REFERENCE TO RELATED APPLICATIONS

This is a continuation application of International Patent Application No. PCT/JP2020/030663 filed Aug. 12, 2020, which claims the benefit of Japanese Patent Application No. 2019-152428 filed Aug. 23, 2019, and the full contents of all of which are hereby incorporated by reference in their entirety.

BACKGROUND

Technical Field

The present disclosure relates to, for example, an optical film suitable for use for a head-up display, and an optical laminate and functional glass using the optical film, and relates to a head-up display using these.

Description of the Related Art

A navigation system, a head-up display (hereinafter also referred to as a "HUD"), and the like are used as methods for displaying information to drivers of cars and airplanes. A HUD is a system which projects images projected from image projection means such as a liquid crystal display (hereinafter also referred to as an "LCD"), for example, on a windshield of a car or the like.

Emission light emitted from image display units is reflected on a reflecting mirror and further reflected on a windshield, and then reaches an observer. Although the observer sees the image projected on the windshield, it appears as if the image were at an image position beyond the windshield. In this method, since the driver can obtain various pieces of information in a state in which the driver gazes ahead of the windshield almost without moving their sight line, a HUD is safer than conventional car navigation systems, in which drivers had to move their sight lines.

A problem was that, although, in a HUD system, display information was projected while being superimposed on a scene actually seen through a windshield, the display light was reflected on the two surfaces inside and outside the windshield, resulting in the reflected image being a double image, and causing the display information to be difficult to see.

With respect to this problem, it is known that the problem of double-image of the reflected image can be improved using a phase difference element which can change a polarization direction by 90° for the windshield for cars. For example, in Japanese Patent Application Publication No. H06-40271, it is disclosed that when display light converted into S polarized light comes into a windshield for cars including a film-like optical rotator therein at a Brewster angle, some of the S polarized light is reflected on the inner surface of the windshield of a car, S polarized light transmitted through the surface is converted into P polarized light by an optical rotator, and all of the P polarized light is further emitted from the outer surface of the windshield of the car to outside of the car to prevent a double image.

Meanwhile, the phase difference value of the phase difference element is important so that a phase difference element may perform suitable polarization conversion at a desired wavelength in such a windshield for cars, or the like.

However, a problem is that this phase difference value changes under various environmental conditions: for example, in a high temperature atmosphere, a high temperature and high humidity atmosphere, or the like.

To solve this problem, for example, a technique using a block layer which suppresses the arrival of a deterioration factor at a light reflecting layer is disclosed in Japanese Patent Application Publication No. 2017-198981. However, the durability (mainly heat resistance) required for the block layer, and the appearance and adhesion at the time of making laminated glass are not disclosed in detail.

SUMMARY

The present disclosure is related to providing an optical film wherein the film is excellent in durability, the phase difference value of a phase difference element hardly changes in a high temperature atmosphere, and the film can maintain stable optical performance, as well as to provide an optical laminate, functional glass, and a head-up display system using the optical film.

According to an aspect of the present disclosure, an optical film, includes (A) an optical functional layer and (B) a block layer, wherein (B) the block layer has a cured product of a resin composition including (B-1) a thermoplastic resin and (B-2) an ultraviolet curable resin.

In one embodiment of the present disclosure, (B-1) the thermoplastic resin is a polyvinyl acetal resin.

In one embodiment of the present disclosure, (B-1) the thermoplastic resin is a thermoplastic resin having a molecular weight of 10,000 or more and 60,000 or less.

In one embodiment of the present disclosure, (B-1) the thermoplastic resin is a polyvinyl acetoacetal resin.

In one embodiment of the present disclosure, a content of (B-1) the thermoplastic resin in the block layer is 1% by mass or more and 80% by mass or less.

In one embodiment of the present disclosure, (B-2) the ultraviolet curable resin is a resin having a (meth)acryloyl group.

In one embodiment of the present disclosure, the resin having a (meth)acryloyl group is an epoxy (meth)acrylate resin.

In one embodiment of the present disclosure, a glass transition temperature of (B) the block layer is 80° C. or more and 300° C. or less.

In one embodiment of the present disclosure, (A) the optical functional layer is any of the following (A-1) to (A-4):
(A-1) a ½ wavelength plate,
(A-2) a ¼ wavelength plate,
(A-3) a laminate of a ½ wavelength plate and a circularly polarized light reflecting layer, and
(A-4) a laminate of a ¼ wavelength plate and a circularly polarized light reflecting layer.

In one embodiment of the present disclosure, the ½ wavelength plate or the ¼ wavelength plate includes a polymerizable liquid crystal layer as a layer having an action of converting a polarization axis.

In one embodiment of the present disclosure, the optical film further includes (C) a supporting substrate.

In one embodiment of the present disclosure, an intermediate film is laminated onto the optical film.

According to another aspect of the present disclosure, a functional glass includes the optical laminate.

According to another aspect of the present disclosure, a head-up display system includes the optical film, the optical laminate, or the functional glass; and image display units for emitting display light that shows an image display.

According to the present disclosure, an optical film wherein the film is excellent in durability, the phase difference value of a phase difference element hardly changes in a high temperature atmosphere, and the film can maintain stable optical performance, as well as functional glass, an optical laminate, and a head-up display system using the optical film, can be provided.

DETAILED DESCRIPTION

Hereinafter, embodiments of the present disclosure will be described with reference to the figures. The following embodiments merely illustrate some typical embodiments of the present disclosure, and various modifications can be added within the scope of the present disclosure. Hereinafter, a term such as "(meth)acryloyl", means "acryloyl" or "methacryloyl", and for example, a "(meth)acrylate" means "acrylate" or "methacrylate". The subscript "RTM" means a registered trademark.

Figure 3:
FIG. 3 is a side sectional view showing one embodiment of an optical film according to the present disclosure.

An optical film of the present disclosure includes (A) an optical functional layer and (B) a block layer. One embodiment of the optical film of the present disclosure is shown in FIG. 3, and an optical film 10 has a configuration in which an optical functional layer 101 and a block layer 102 are laminated. Although, in FIG. 3, the block layer 102 is laminated onto one surface of the optical functional layer 101, block layers 102 may be laminated onto both surfaces of the optical functional layers 101. When the block layer 102 is laminated onto one surface of the optical functional layer 101, it is preferable that (C) the supporting substrate described below be provided on the other surface of the optical functional layer 101.

[(A) Optical Functional Layer]

As long as the optical functional layer used for the present disclosure is a layer having the function of converting the polarization axis of incident light, the optical functional layer is not particularly limited, and can be suitably designed to obtain desired deflected light. Examples include a phase difference element such as a ½ wavelength plate or a ¼ wavelength plate, a laminate of a plurality of the phase difference elements, or a laminate of a phase difference element and a circularly polarized light reflecting layer. (A-1) a ½ wavelength plate, (A-2) a ¼ wavelength plate, (A-3) a laminate of a ½ wavelength plate and a circularly polarized light reflecting layer, or (A-4) a laminate of a ¼ wavelength plate and a circularly polarized light reflecting layer can be specifically illustrated. For example, when the optical film is used for the above-mentioned HUD system, it is preferable to use the ½ wavelength plate.

When the ½ wavelength plate is used as the optical functional layer, the ½ wavelength plate is a phase difference element having the function of converting P polarized light into S polarized light, or converting S polarized light into P polarized light, namely converting a polarization axis, and for example, can be obtained by monoaxially stretching a film including a polycarbonate or cycloolefin polymer so that phase difference is ½ of a wavelength or by orienting a horizontally oriented polymerizable liquid crystal at a thickness such that the phase difference is ½ of a wavelength. The ½ wavelength plate using a horizontally oriented polymerizable liquid crystal generally includes a polymerizable liquid crystal layer as a layer having the action of converting a polarization axis and a supporting substrate to be coated with a coating liquid which forms the polymerizable liquid crystal layer. It is preferable that the upper limit value of the thickness of such a ½ wavelength plate be 10 μm or less, and it is more preferable that the upper limit value be 5 μm or less from the viewpoint of the orientation of the liquid crystal. Meanwhile, it is preferable that the lower limit value of the thickness of a ½ wavelength plate be 0.3 μm or more, and it is more preferable that the lower limit value be 0.5 μm or more from the viewpoint of the polymerizability of the liquid crystal. When light comes into the main surface of the ½ wavelength plate from an oblique position, the phase difference may change depending on the incidence angle of light. In such a case, to adapt the phase difference more strictly, change in the phase difference accompanied with the incidence angle can be suppressed, for example, by using a phase difference element in which the refractive index of the phase difference element is adjusted. For example, when the refractive index in the direction of a slow axis in the surface of the phase difference element is defined as nx, the refractive index in the direction at right angles to nx in the surface of the phase difference element is defined as ny, and the refractive index in the thickness direction of the phase difference element is defined as nz, the coefficient Nz represented by the following Expression (1) is controlled to preferably 0.3 or more and 1.0 or less, more preferably 0.5 or more and 0.8 or less.

[Expression 1]

$$Nz=(nx-nz)/(nx-ny) \qquad (1)$$

When the functional glass of the present disclosure described below is provided with an optical film using such a ½ wavelength plate, and the functional glass is applied to a HUD system, in the HUD system, it is preferable that the angle θ which the slow axis of the ½ wavelength plate forms with the polarization axis of S polarized light or the polarization axis of P polarized light which comes in from an oblique position at 45° or more and 65° or less to the axis perpendicular to the surface of the functional glass be controlled to 35° or more and 47° or less to convert P polarized light into S polarized light or convert S polarized light into P polarized light efficiently. When P polarized light comes into the functional glass, the reflectance on the surface of the functional glass can be theoretically suppressed to 2% or less by adjusting the incidence angle of S polarized light or P polarized light which comes into the ½ wavelength plate to the range of 45° or more and 65° or less. Transmitted P polarized light is converted into S polarized light with the ½ wavelength plate, and the converted S polarized light is reflected on the interface between the functional glass on the side opposite to the incidence side and air. The reflected S polarized light is converted into P polarized light with the ½ wavelength plate again, and this P polarized light reaches an observer. When S polarized light comes into the functional glass, the S polarized light is reflected on the surface of the functional glass, and this S polarized light reaches the observer. Some of the transmitted S polarized light is converted into P polarized light with the ½ wavelength plate, the converted P polarized light is not reflected on the functional glass on the side opposite to the incidence side or the interface between the functional glass and air, and passes. Thus, the formation of a double image can be suppressed by controlling the incidence angle of S polarized light or P polarized light which comes into the functional glass. When the angle θ is less than 35° or more than 47°, the polarization axis conversion performance for converting P polarized light which comes into the functional glass into S polarized light or converting S polarized light which comes into the functional glass into P polarized light is low, and consequently the display image on the display may also be dark. The ½ wavelength plate exhibits good polarization axis conversion performance by controlling this angle θ appropriately, and the display image can be consequently visually confirmed more clearly.

It is preferable that the angle θ be a value calculated from the following Expressions (2) and (3) to appropriately control the conversion performance of the polarization axis which the ½ wavelength plate exhibits. Here, the technical meaning of the following Expressions (2) and (3) will be described. When S polarized light or P polarized light which comes into the functional glass passes the ½ wavelength plate, which is a medium having a refractive index different from air, the incidence angle at which the S polarized light or the P polarized light comes into the ½ wavelength plate changes. Here, when the incidence angle which S polarized light or P polarized light forms with the functional glass is defined as $n_\alpha$, the incidence angle at which the S polarized light or the P polarized light actually comes into the ½ wavelength plate, namely the refraction angle of the ½ wavelength plate is defined as β, the refractive index of air is defined as $n_\alpha$, and the refractive index of the ½ wavelength plate is defined as $n_\beta$, sin α/sin β=$n_\beta$/$n_\alpha$ is valid according to Snell's law. When this expression is simplified to an equation in which β is found, Expression (3) is derived. Meanwhile, if a phase difference value when the polarization axis of S polarized light which comes into the functional glass is defined as the x-axis, the polarization axis of P polarized light is the y-axis, and an angle which the y-axis and the slow axis of the ½ wavelength plate form is defined as θ is Re, the y-axis is represented by Re• cos θ, and the x-axis is represented by Re• sin θ using vector analysis. Here, since it is known that the polarization axis conversion performance of the ½ wavelength plate is maximum when light comes in at 45° to the slow axis of the ½ wavelength plate, it is desirable that the incidence angle to the slow axis of ½ wavelength plate be theoretically 45°. However, as mentioned above, even though the incidence angle of S polarized light or P polarized light which comes into the functional glass is defined as θ, the angle at which the S polarized light or the P polarized light comes into the ½ polarizing plate is actually β. Then, when, as to the y-axis (theoretical y-axis) which is Re• cos θ, the y-axis inclined at an angle of β around the x-axis (actual y-axis) is found, Re• cos θ/actual y-axis=sin (90°-β) is valid, and the actual y-axis is represented by Re• cos θ cos β. The x-axis (Re• sin θ) needs to be equal to the actual y-axis (Re• cos θ cos β) to adjust an angle which the polarization axis of the S polarized light or the P polarized light which comes into the functional glass and the slow axis of the ½ wavelength plate form to 45°, which is a desirable incidence angle. Therefore, Re• sin θ=Re• cos θ cos β is found, and Expression (2) is derived by simplifying this expression. Thus, the polarization axis conversion performance which the ½ wavelength plate exhibits can be utilized to the utmost by controlling the angle θ strictly using the relationship with the angle β at which the S polarized light or the P polarized light actually comes into the ½ polarizing plate based on a value calculated from the following Expressions (2) and (3).

[Expression 2]

$$\tan\theta = \cos\beta \qquad (2)$$

$$\beta = \sin^{-1}\left(\sin\alpha \cdot \frac{n_\alpha}{n_\beta}\right) \qquad (3)$$

θ: Angle which slow axis of ½ wavelength plate and polarization axis of S polarized light or P polarized light which comes in at any incidence angle of α to functional glass form α: Incidence angle of S polarized light or P polarized light to functional glass $n_\alpha$: Refractive index of air $n_\beta$: Refractive index of ½ wavelength plate It is preferable that the range of the angle θ be controlled to the range of the value of the angle θ±5°, and it is more preferable that the range of the angle θ be controlled to the range of the value of the angle θ±3°. When the angle θ is out of the range of an angle which satisfies a value calculated from expressions (2) and (3) ±5°, the efficiency in converting the polarization axis from P polarized light to S polarized light which the ½ wavelength plate exhibits decreases. A decrease in the efficiency in converting the polarization axis from P polarized light to S polarized light with the ½ wavelength plate can be suppressed by controlling the range of the angle θ based on the value calculated from expressions (2) and (3).

As the refractive index of the ½ wavelength plate substituted for expression (3), the refractive index in the direction of the slow axis of the ½ wavelength plate is defined as nx, the refractive index in the direction at right angles to nx in the plane of the ½ wavelength plate is defined as ny, the refractive index in the thickness direction of the ½ wavelength plate is defined as nz, and a value obtained by averaging these is used as an average refractive index. When a ½ wavelength plate which is a commercial item is used, a value listed on a catalog or the like can also be used as the average refractive index. When the polymerizable liquid crystal described below is used as a material of the ½ wavelength plate, the average refractive index is represented by (nx+ny+nz)/3=(no+ne)/2 using the original ordinary refractive index no and the extraordinary refractive index ne. If specific examples of θ calculated from expression (2) and (3) are given, for example, when the refractive index of air is defined as 1.00, a ½ wavelength plate having a refractive index of 1.55 is used, and the incidence angle of S polarized light or P polarized light is 45°, the value of θ is 42° based on expressions (2) and (3). Therefore, the range of θ is preferably 37° or more and 47° or less, and more preferably 39° or more and 45° or less. When the incidence angle of S polarized light or P polarized light is 50°, the value of θ is 41° based on expressions (2) and (3). Therefore, it is preferable that the range of θ be 36° or more and 46° or less, and it is more preferable that the range be 38° or more and 44° or less. When the incidence angle of S polarized light or P polarized light is 56°, the value of θ is 40° based on expressions (2) and (3). Therefore, it is preferable that the range of θ be 35° or more and 45° or less, and it is preferable that the range be 37° or more and 43° or less. Furthermore, when the incidence angle of S polarized light or P polarized light is 65°, the value of θ is 39° based on expressions (2) and (3). Therefore, it is preferable that the range of θ be 34° or more and 44° or less, and it is more preferable that the range be 36° or more and 42° or less. The ½ wavelength plate exhibits good polarization axis conversion performance by controlling an angle which the polarization axis of S polarized light or P polarized light which comes in from an oblique position at 45° or more and 65° or less to the axis perpendicular to the surface of the functional glass and the slow axis of the ½ wavelength plate form to 35° or more and 47° or less. Consequently, a HUD system in which a display image can be visually confirmed more clearly can be provided.

As mentioned above, in the present disclosure, the polarization axis conversion performance which the ½ wavelength plate exhibits can be further enhanced by controlling the angle θ which the polarization axis of P polarized light or S polarized light which comes into the functional glass and the slow axis of the ½ wavelength plate form. In such a case, it is particularly preferable to use a ½ wavelength plate including a polymerizable liquid crystal layer as a layer having the action of converting a polarization axis from the viewpoints of the controllability of the slow axis of the ½ wavelength plate and manufacturing cost.

The polymerizable liquid crystal is a nematic liquid crystal monomer which has polymerizable groups in a molecule, and exhibits liquid crystallinity in a certain temperature range or a certain concentration range. Examples of the polymerizable groups include a (meth)acryloyl group, a vinyl group, a chalconyl group, a cinnamoyl group, and an epoxy group. In order that the polymerizable liquid crystal exhibits liquid crystallinity, it is preferable that a mesogen group exist in a molecule. The mesogen group means a rod-like or plate-like substituent such as a biphenyl group, a terphenyl group, a (poly)phenyl benzoate ester group, a (poly)ether group, a benzylideneaniline group, or an acenaphthoquinoxaline group; or a disk-like substituent such as a triphenylene group, a phthalocyanine group, or an azacrown group, namely a group having the capability to induce liquid crystal phase behavior. A liquid crystal compound having a rod-like or plate-like substituent is known as a calamitic liquid crystal in the technical field. Examples of the nematic liquid crystal monomer having such polymerizable groups include polymerizable liquid crystals described in Japanese Patent Application Publication No. 2003-315556, Japanese Patent Application Publication No. 2004-29824, and the like; and polymerizable liquid crystals such as the PALIOCOLOR series (produced by BASF SE) and the RMM series (produced by Merck KGaA). The nematic liquid crystal monomers having these polymerizable groups may be used singly or as a mixture of two or more.

A polymerizable compound which can react with a nematic liquid crystal monomer having polymerizable groups and does not have liquid crystallinity can also be added. Examples of such a compound include ultraviolet curable resins. Examples of the ultraviolet curable resins include dipentaerythritol hexa(meth)acrylate, the reaction product of dipentaerythritol penta(meth)acrylate and 1,6-hexamethylene diisocyanate, a reaction product of a triisocyanate having an isocyanuric ring and pentaerythritol tri(meth)acrylate, the reaction product of pentaerythritol tri(meth)acrylate and isophorone diisocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris(acryloxyethyl) isocyanurate, tris(methacryloxyethyl) isocyanurate, the reaction product of glycerol triglycidyl ether and (meth)acrylic acid, caprolactone-modified tris(acryloxyethyl) isocyanurate, the reaction product of trimethylolpropane triglycidyl ether and (meth)acrylic acid, triglycerol di(meth)acrylate, the reaction product of propylene glycol diglycidyl ether and (meth)acrylic acid, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, the reaction product of 1,6-hexanediol diglycidyl ether and (meth)acrylic acid, 1,6-hexanediol di(meth)acrylate, glycerol di(meth)acrylate, the reaction product of ethylene glycol diglycidyl ether and (meth)acrylic acid, the reaction product of diethylene glycol diglycidyl ether and (meth)acrylic acid, bis(acryloxyethyl) hydroxyethyl isocyanurate, bis(methacryloxyethyl)hydroxyethyl isocyanurate, the reaction product of bisphenol A diglycidyl ether and (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth)acrylate, methoxytetraethylene glycol (meth)acrylate, methoxytriethylene glycol (meth)acrylate, methoxyethylene glycol (meth)acrylate, methoxyethyl (meth)acrylate, glycidyl (meth)acrylate, glycerol (meth)acrylate, ethylcarbitol (meth)acrylate, 2-ethoxyethyl (meth)acrylate, N,N-dimethylaminoethyl (meth)acrylate, 2-cyanoethyl (meth)acrylate, the reaction product of butyl glycidyl ether and (meth)acrylic acid, butoxytriethylene glycol (meth)acrylate, and butanediol mono(meth)acrylate. These may be used singly or as a mixture of two or more. These ultraviolet curable resins not having liquid crystallinity have to be added to such an extent that the composition containing a nematic liquid crystal monomer does not lose liquid crystallinity, and the content of the ultraviolet curable resin is preferably 0.1 to 20 parts by mass, and more preferably 1.0 to 10 parts by mass based on 100 parts by mass of the nematic liquid crystal monomer having polymerizable groups.

When the nematic liquid crystal monomer having the above-mentioned polymerizable group and the polymerizable compound not having liquid crystallinity are ultraviolet curable, a photopolymerization initiator is added to cure a composition containing these by ultraviolet rays. Examples of the photopolymerization initiator include acetophenone-based compounds such as 2-methyl 1-[4-(methylthio)phenyl]-2-morpholinopropane-1 (Irgacure® 907 produced by BASF SE), 1-hydroxycyclohexyl phenyl ketone (Irgacure® 184 produced by BASF SE), 4-(2-hydroxyethoxy)-phenyl (2-hydroxy-2-propyl)ketone (Irgacure® 2959 produced by BASF SE), 1-(4-dodecylphenyl)-2-hydroxy-2-methylpropan-1-one (Darocur® 953 produced by Merck KGaA), 1-(4-isopropylphenyl)-2-hydroxy-2-methylpropan-1-one (Darocur® 1116 produced by Merck KGaA), 2-hydroxy-2-methyl-1-phenylpropan-1-one (Irgacure® 1173 by BASF SE), and diethoxyacetophenone; benzoin-based compounds such as benzoin, benzoin methyl ether, benzoin ethyl ether, benzoin isopropyl ether, benzoin isobutyl ether, and 2,2-dimethoxy-2-phenylacetophenone (Irgacure® 651 produced by BASF SE); benzophenone-based compounds such as benzoylbenzoic acid, methyl benzoylbenzoate, 4-phenylbenzophenone, hydroxybenzophenone, 4-benzoyl 4'-methyldiphenyl sulfide, and 3,3'-dimethyl-4-methoxybenzophenone (Kayacure® MBP produced by Nippon Kayaku Co., Ltd.); and thioxanthone-based compounds such as thioxanthone, 2-chlorothioxanthone (Kayacure® CTX produced by Nippon Kayaku Co., Ltd.), 2-methylthioxanthone, 2, 4-dimethylthioxanthone (Kayacure® RTX), isopropylthioxanthone, 2,4-dichlorothioxanthone (Kayacure® CTX produced by Nippon Kayaku Co., Ltd.), 2,4-diethylthioxanthone (Kayacure® DETX produced by Nippon Kayaku Co., Ltd.), and 2,4-diisopropylthioxanthone (Kayacure® DITX produced by Nippon Kayaku Co., Ltd.). Preferable examples of the photopolymerization initiator include Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, and Irgacure 1173 (all are produced by BASF SE), and particularly preferable examples include Irgacure TPO, Irgacure TPO-L, Irgacure OXE01, Irgacure OXE02, Irgacure 1300, and Irgacure 907. These photopolymerization initiators can be used singly or as a mixture obtained by mixing two or more at any ratio.

When the benzophenone-based compound or the thioxanthone-based compound is used as the photopolymerization initiator, an auxiliary agent can also be used in combination to promote photopolymerization reaction. Example of such an auxiliary agent include amine-based compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy) ethyl 4-dimethylaminobenzoate, and isoamyl 4-dimethylaminobenzoate.

It is preferable that the amounts of the above-mentioned photopolymerization initiator and auxiliary agent added are such that the amounts thereof used do not affect the liquid crystallinity of the above-mentioned composition. The amounts thereof are preferably 0.5 parts by mass or more and 10 parts by mass or less, and more preferably 2 parts by mass or more and 8 parts by mass or less based on 100 parts by mass of the compound cured by ultraviolet rays in the composition. It is preferable that the amount of the auxiliary agent be 0.5 times or more and 2 times or less as many as the amount of the photopolymerization initiator.

The heat resistance of the ½ wavelength plate can further be improved, and a change in the phase difference value of the ½ wavelength plate can also be further reduced in a high temperature atmosphere by adding at least one compound selected from the group consisting of a compound represented by the following formula (4), a compound represented by the following formula (5), and a compound represented by the following formula (6) (hereinafter also referred to as merely an "additive compound") with a liquid crystalline compound.

[Formula 1]

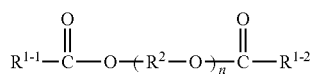
(4)

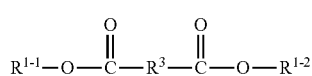
(5)

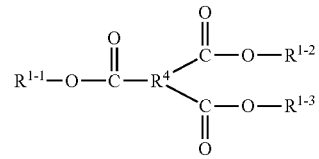
(6)

In formula (4) to formula (6), $R^{1-1}$, $R^{1-2}$, and $R^{1-3}$ each independently represent an alkyl group having a branched structure with 5 or more carbon atoms. When $R^{1-1}$, $R^{1-2}$, and $R^{1-3}$ are each independently an alkyl group having a branched structure, a change in the phase difference value of the ½ wavelength plate in a high temperature atmosphere particularly decreases. It is preferable that the carbon number be 6 or more and 18 or less. It is more preferable that $R^{1-1}$, $R^{1-2}$, and $R^{1-3}$ be each independently a $CH_3$—$(CH_2)_m$—CHRX— group. Here, it is further preferable that RX represent an alkyl group having 1 to 5 carbon atoms, and $R^{1-1}$, $R^{1-2}$, and $R^{1-3}$ be each independently a $CH_3$—$(CH_2)_m$—$CH(C_2H_5)$— group, and it is particularly preferable that $R^{1-1}$, $R^{1-2}$, and $R^{1-3}$ be each independently a 2-ethylhexyl group or a 2-ethylbutyl group. Here, m represents an integer in the range of 1 to 6. In formula (5), $R^3$ represents a —$(CH_2)_p$— group or a phenylene group, and p represents an integer of 4 to 8. When $R^3$ is a phenylene group, the phenylene group may have a substituent at any of an ortho position, a meta position, and a para position, and it is preferable that the phenylene group have a substituent at an ortho position. In formula (6), $R^4$ represents a substituted phenylene group. Although the substituted phenylene group may have a substituent at any of an ortho position, a meta position, and a para position, it is preferable that the substituted phenylene group have substituents at an ortho position and a para position. In formula (4), $R^2$ represents a —$CH_2$—$CH_2$— group, a —$CH_2$—$CH(CH_3)$— group, or a —$CH_2$—$CH_2$—$CH_2$— group, and the —$CH_2$—$CH_2$— group is preferable.

Examples of the compound represented by formula (4) include triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate, pentaethylene glycol di-2-ethylhexanoate, octaethylene glycol di-2-ethylhexanoate, nonaethylene glycol di-2-ethylhexanoate, and decaethylene glycol di-2-ethylhexanoate.

Examples of the compound represented by formula (5) include bis(2-ethylhexyl) adipate, bis(2-ethylbutyl) adipate, bis(2-ethylhexyl) adipate, bis(2-ethylbutyl) azelate, di-2-ethylhexyl sebacate, di-2-ethylbutyl sebacate, and di-2-ethylhexyl phthalate, and di-2-ethylbutyl phthalate.

Examples of the compound represented by formula (6) include tri-2-ethylhexyl trimellitate and tri-2-ethylbutyl trimellitate.

The compound represented by formula (4), the compound represented by formula (5), and the compound represented by formula (6) may be used singly or in combination of two or more. It is preferable that, among these, the compound represented by formula (4) be used because the compound is excellent in compatibility with the above-mentioned liquid crystalline compound and a stable phase difference element can be obtained. Among the compounds represented by a formula (4), triethylene glycol di-2-ethylhexanoate (3GO), tetraethylene glycol di-2-ethylhexanoate (4GO) and triethylene glycol di-2-ethylbutyrate (3GH) are more preferable, and triethylene glycol di-2-ethylhexanoate (3GO) is further preferable due to excellent compatibility with the liquid crystalline compound and an excellent effect of suppressing a change in the phase difference value of the ½ wavelength plate in a high temperature atmosphere.

Although the content of at least one additive compound selected from the group consisting of the compound represented by formula (4), the compound represented by a formula (5) and the compound represented by formula (6) is not particularly limited, it is preferable that the content be 0.1 parts by mass or more and 300 parts by mass or less, it is more preferable that the content be 0.5 parts by mass or more and 50 parts by mass or less, it is further preferable that the content be 0.8 parts by mass or more and 30 parts by mass or less, and it is particularly preferable that the content be 1 part by mass or more and 15 parts by mass or less, based on 100 parts by mass of the above-mentioned liquid crystalline compound. When the content of the above-mentioned additive compound is less than 0.1 parts by mass, the effect of suppressing a change in the phase difference value of the ½ wavelength plate in a high temperature atmosphere may not be obtained. Meanwhile, even though the content of the above-mentioned additive compound is more than 300 parts by mass, the effect of suppressing a change in the phase difference value of the ½ wavelength plate in a high temperature atmosphere does not change, and it is preferable that the upper limit value of the content of the above-mentioned additive compound be therefore 300 parts by mass or less from the viewpoint of material cost.

A ¼ wavelength plate can also be used as an optical functional layer depending on the design of a HUD system. The ¼ wavelength plate is a phase difference element having the function of converting circularly polarized light into linear polarized light, and, for example, can be obtained by monoaxially stretching a film including a polycarbonate or cycloolefin polymer so that the phase difference is ¼ of a wavelength or by orienting a horizontally oriented polymerizable liquid crystal at a thickness such that the phase difference is ¼ of a wavelength. It is preferable that the ¼ wavelength plate include the above-mentioned polymerizable liquid crystal layer. In such a case, the ¼ wavelength plate includes the above-mentioned polymerizable liquid crystal layer as a layer having the action of converting a polarization axis and a supporting substrate to be coated with a coating liquid for forming the polymerizable liquid crystal layer.

When the deviation of the phase difference due to wavelength dispersion is large as the ¼ wavelength plate, a phase difference element called a broadband ¼ wavelength plate may be used. The broadband ¼ wavelength plate is a phase difference element in which the wavelength dependence of the phase difference is reduced. Examples include a phase difference element in which a ½ wavelength plate and a ¼ wavelength plate having the same wavelength dispersion are laminated so that an angle which the respective slow axes form is 60° and a polycarbonate-based phase difference element in which the wavelength dependence of the phase difference is reduced (manufactured by TEIJIN LIMITED: PURE-ACE WR-S). Moreover, when light comes in at an oblique incidence angle to the ¼ wavelength plate like a HUD, the phase difference may change with the incidence angle of light depending on the phase difference element. In such a case, as a method for matching the phase difference more strictly, for example, a change in the phase difference with the incidence angle can be suppressed by using a phase difference element in which the refractive index of the phase difference element is adjusted. As such an example, when the refractive index in the direction of the slow axis in the plane of the phase difference element is defined as nx, the refractive index in the direction perpendicular to nx in the plane of the phase difference element is defined as ny, and the refractive index in the thickness direction of the phase difference element is defined as nz, the coefficient Nz, which is represented by the above-mentioned expression (1), is controlled to preferably 0.3 to 1.0, more preferably 0.5 to 0.8.

When the functional glass of the present disclosure described below is provided with an optical film using such a ¼ wavelength plate, and the functional glass is applied to the HUD system, it is preferable that the optical functional layer be a laminate of the ¼ wavelength plate and a circularly polarized light reflecting layer. Specifically, it is preferable that the optical functional layer include the circularly polarized light reflecting layer, a first ¼ wavelength plate laminated onto one surface of the circularly polarized light reflecting layer, and a second ¼ wavelength plate laminated onto the other surface of the circularly polarized light reflecting layer. As the circularly polarized light reflecting layer, a light reflecting layer using a cholesteric liquid crystal is suitably used. In the case of such a configuration, in the HUD system, among the two ¼ wavelength plates, the first ¼ wavelength plate is provided on the side from which S polarized light or P polarized light comes in, and the second ¼ wavelength plate is provided on the side from which the circularly polarized light transmitted through the circularly polarized light reflecting layer comes in. For example, when the circularly polarized light reflecting layer has a right circularly polarized light reflecting function, the incidence of P polarized light into the first ¼ wavelength plate leads to the transmission of the P polarized light through the first ¼ wavelength plate almost without reflecting the P polarized light on the interface of the first ¼ wavelength plate. The transmitted P polarized light is converted into right circularly polarized light with the first ¼ wavelength plate, and some of this right circularly polarized light is reflected on the circularly polarized light reflecting layer by the right circularly polarized light conversion performance of the circularly polarized light reflecting layer. The reflected right circularly polarized light is converted into the original P polarized light with the first ¼ wavelength plate again, and this P polarized light reaches the observer. Although the right circularly polarized light which is transmitted through the circularly polarized light reflecting layer without being reflected on the circularly polarized light reflecting layer returns to the original P polarized light with the second ¼ wavelength plate, this P polarized light is transmitted almost without being reflected on the outer interface of the second ¼ wavelength plate. Meanwhile, also when S polarized light comes into the first ¼ wavelength plate, the S polarized light is reflected on the surface of the first ¼ wavelength plate, and this S polarized light reaches the observer. The S polarized light which is transmitted through the first ¼ wavelength plate without being reflected on the first ¼ wavelength plate is converted into left circularly polarized light with the first ¼ wavelength plate. Although this left circularly polarized light is transmitted through the circularly polarized light reflecting layer without being reflected on the circularly polarized light reflecting layer having a right circularly polarized light reflecting function, and returns to the original S polarized light with the second ¼ wavelength plate, this S polarized light is transmitted almost without being reflected on the outer interface of the second ¼ wavelength plate. When the circularly polarized light reflecting layer has a left circularly polarized light reflecting function, P polarized light or S polarized light reaches the observer in the same principle.

It is preferable that the upper limit value of the thickness of the ¼ wavelength plate be 10 μm or less, and it is more preferable that the upper limit value be 5 μm or less from the viewpoint of the orientation of the liquid crystal. Meanwhile, it is preferable that the lower limit value of the thickness of the ¼ wavelength plate be 0.3 μm or more, and it is more preferable that the lower limit value be 0.5 μm or more. It is preferable that the upper limit value of the thickness of the circularly polarized light reflecting layer be 10 μm or less, and it is more preferable that the upper limit value be 5 μm or less from the viewpoint of the orientation of the liquid crystal. Meanwhile, it is preferable that the lower limit value of the thickness of the circularly polarized light reflecting layer be 0.3 μm or more, and it is more preferable that the lower limit value be 0.5 μm or more from the viewpoint of the polymerizability of the liquid crystal.

In the optical film of the present disclosure, two or more (A) optical functional layers may be provided. In this case, although nothing may be used between the optical functional layers, namely, the optical functional layers may be laminated directly, it is preferable that an adhesive layer using a pressure sensitive adhesive be provided between the optical functional layers. Although examples of the pressure sensitive adhesive include an acrylic or rubber-based adhesive, the acrylic pressure sensitive adhesive, in which the adhesiveness, the holding power, and the like are easily adjusted, is preferable. Examples of the adhesive include ultraviolet curable resin compositions, thermosetting resin compositions, and mixtures thereof. In the case of an ultraviolet curable resin composition, the optical functional layers can be adhered by irradiating ultraviolet rays and curing the composition in which a plurality of monomers having acryloyl groups or epoxy groups is mixed in the presence of a photopolymerization initiator. In the case of a thermosetting resin composition, the optical functional layers can be adhered by heating and curing the composition in which a plurality of monomers having epoxy groups in the presence of an acid catalyst. Alternatively, the optical functional layers can be adhered by heating and curing a composition including a plurality of monomers or polymers having amino groups, carboxyl groups, and hydroxyl groups in the presence of a compound having isocyanate groups or melamine.

[(B) Block Layer]

In the optical film of the present disclosure, the block layer has a cured product (cured film) of a resin composition containing (B-1) a thermoplastic resin and (B-2) an ultraviolet curable resin (hereinafter also referred to as a "resin composition for forming a block layer"). The phase difference element provided as (A) the optical functional layer can be protected from a deterioration factor by providing the optical film with the block layer containing a thermoplastic resin. The optical film having such a block layer is excellent in durability, mainly a hue change (ΔE) after a heat resistance test, and also excellent in appearance and adhesion at the time of forming laminated glass using the optical film. Therefore, an optical film wherein durability, especially heat resistance, is high in a high temperature atmosphere, and a change in the phase difference value of the phase difference element can be suppressed over a long period of time while high visible light transmittance is maintained can be provided. The block layer may be a monolayer, or two or more may be laminated.

[(B-1) Thermoplastic Resin]

(B-1) The thermoplastic resin is not particularly limited, and may be a resin in which thermoplasticity in such a degree that the resin can be molded by heating is obtained. Examples of such a thermoplastic resin include polyvinyl acetal resins, high density polyethylene resins, low density polyethylene resins, linear low density polyethylene resins, ultra-low density polyethylene resins, polypropylene resins, polybutadiene resins, cyclic olefin resins, polymethylpentene resins, polystyrene resins, ethylene-vinyl acetate copolymers, ionomer resins, ethylene-vinyl alcohol copolymer resins, ethylene-ethyl acrylate copolymers, acrylonitrile-styrene resins, acrylonitrile-chlorinated polystyrene-styrene copolymer resins, acrylonitrile-acrylic rubber-styrene copolymer resins, acrylonitrile-butadiene-styrene copolymer resin, acrylonitrile-EPDM-styrene copolymer resins, silicone rubber-acrylonitrile-styrene copolymer resins, cellulose-acetate-butyrate resin, cellulose acetate resins, methacrylic resins, ethylene-methyl methacrylate copolymer resin, ethylene-ethyl acrylate resins, vinyl chloride resins, chlorinated polyethylene resins, polytetrafluoroethylene resins, tetrafluoroethylene-hexafluoropropylene copolymer resins, tetrafluoroethylene-perfluoroalkyl vinyl ether copolymer resins, tetrafluoroethylene-ethylene copolymer resin, polytrifluorochloroethylene resins, polyvinylidene fluoride resins, nylon 4,6, nylon 6, nylon 6,6, nylon 6,10, nylon 6,12, nylon 12, nylon 6T, nylon 9T, aromatic nylon resins, polyacetal resins, ultra-high molecular weight-polyethylene resins, polybutylene terephthalate resins, polyethylene terephthalate resins, polyethylene naphthalate resins, amorphous copolyester resins, polycarbonate resins, modified polyphenylene ether resins, thermoplastic polyurethane elastomers, polyphenylene sulfide resins, polyether ether ketone resins, liquid crystal polymers, polytetrafluoroethylene resins, polyfluoroalkoxy resins, polyetherimide resins, polysulfone resins, polyketone resins, thermoplastic polyimide resins, polyamide-imide resins, polyarylate resins, polysulfone resins, polyether sulfone resins, biodegradable resins, and biomass resins. The thermoplastic resins may be used singly or in combination of two or more.

Examples of a commercial item which is the thermoplastic resin include S-LEC® BL-1, BL-1H, BL-2, BL-2H, BL-5, BL-10, BL-S, BL-L, BM-1, BM-2, BM-5, BM-S, BH-3, BH-6, BH-S, BX-1, BX-5, KS-10, KS-1, KS-3, and KS-5 (all are produced by SEKISUI CHEMICAL CO., LTD.); the VYLON® series, which is amorphous polyester resins and crystalline polyester resins, the VYLONAL® series, which is aqueous dispersible polyester resins, the VYLON® UR series, which is polyester urethane resins, the Vyloecol® series, which is amorphous polylactic acid resins (all are produced by TOYOBO CO., LTD.); the SEPTON® series and the HYBRAR® series, which are styrene-based elastomers, the KURARITY® series, which is an acrylic block copolymer, the EARNESTON® series, which is a thermoplastic elastomer compound, the KURAPRENE® series, which is isoprene-based (all are produced by Kuraray Co., Ltd.); DENKA POVAL® which is polyvinyl alcohol (produced by Denka Company Limited); the YS RESIN® PX series and the YS RESIN® PXN series, which are terpene resins; YS RESIN® TO, which is aromatic modified terpene resins (all are produced by YASUHARA CHEMICAL CO., LTD.); and YS POLYSTER® U, YS POLYSTER® T, YS POLYSTER® S, YS POLYSTER® G, YS POLYSTER® N, YS POLYSTER® K, and YS POLYSTER® TH, which are terpene phenol resins (all are produced by YASUHARA CHEMICAL CO., LTD.).

Among these, a polyvinyl acetal resin is preferable from the viewpoints of appearance and adhesion at the time of forming laminated glass using the optical film, change from a hue before a heat resistance test to a hue after the heat resistance test (ΔE), optical characteristics before and after a heat resistance test, and the like. The polyvinyl acetal resin is a resin obtained by reacting an aldehyde with polyvinyl alcohol, and is a compound represented by the following formula (7).

[Formula 2]

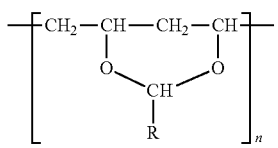

(7)

In formula (7), R represents a linear, branched, or annular $C_1$ to $C_{10}$ alkyl group, and is preferably a linear $C_1$ to $C_6$ alkyl group, further preferably a linear $C_1$ to $C_4$ alkyl group, particularly preferably $C_1$, namely a methyl group (polyvinyl acetoacetal resin), or $C_4$, namely a n-butyl group (polyvinyl butyral resin), and the most preferably a methyl group. When R is a methyl group, namely when the thermoplastic resin is a polyvinyl acetoacetal resin, the hue hardly changes especially before and after a durability test, and the practicality is high.

In the above-mentioned formula (7), n represents the number of repeating units, and is preferably 50 or more and 1500 or less. The upper limit of n is more preferably 1000, further preferably 800, particularly preferably 600, and the most preferably 200. The lower limit of n is more preferably 70, further preferably 100, particularly preferably 120, and the most preferably 150.

A preferable molecular weight (weight average molecular weight: Mw) of the thermoplastic resin is 6,000 or more and 1,000,000 or less. The upper limit of the molecular weight is more preferably 120,000, further preferably 96,000, particularly preferably 60,000, and the most preferably 20,000. The lower limit of the molecular weight is more preferably 8,500, further preferable 10,000, particularly preferably 12,000, and the most preferably 16,000. That is, it is the most preferable that the molecular weight of the thermoplastic resin be 10,000 or more and 60,000 or less. The above-mentioned weight average molecular weight is measured by the gel permeation chromatography (GPC).

The case where the content of the thermoplastic resin in the block layer is 1% by mass or more and 80% by mass or less is one of preferable aspects. The upper limit of the content of the thermoplastic resin in the block layer is more preferably 50% by mass, further preferably 40% by mass, and particularly preferably 30% by mass. More preferable lower limit of the thermoplastic resin in the block layer is 2% by mass, further preferably 5% by mass, and particularly preferably 10% by mass. That is, it is the most preferable that the content of the thermoplastic resin in the block layer be 10% by mass or more and 30% by mass or less.

[(B-2) Ultraviolet Curable Resin]

(B) The block layer has (B-2) the ultraviolet curable resin. Examples of the ultraviolet curable resin include resins having vinyl groups, vinyl ether groups, allyl groups, maleimide groups, and (meth)acryloyl groups. Among those, it is preferable that the ultraviolet curable resin be a resin having (meth)acryloyl groups, for example, a (meth)acrylate compound from the viewpoints of reactivity and versatility. The ultraviolet curable resins may be used singly or in combination of two or more.

Examples of the resin having (meth)acryloyl groups include (meth)acrylate resins such as 2-hydroxyethyl (meth)acrylate, 2-hydroxypropyl (meth)acrylate, 1,4-butanediol mono(meth)acrylate, Carbitol (meth)acrylate, acryloyl morpholine, a half ester which is a reaction product of hydroxyl group-containing (meth)acrylate and an acid anhydride of a polycarboxylic compound, polyethylene glycol di(meth)acrylate, tripropylene glycol di(meth) acrylate, trimethylolpropane tri(meth)acrylate, trimethylolpropanepolyethoxy tri(meth)acrylate, glycerin polypropoxy tri(meth)acrylate, a di(meth)acrylate of an c-caprolactone adduct of neopentyl glycol hydroxypivalate, (for example, produced by Nippon Kayaku Co., Ltd., KAYARAD® HX-220, HX-620, or the like), pentaerythritol tetra(meth)acrylate, a poly(meth)acrylate of a reaction product of dipentaerythritol and c-caprolactone, dipentaerythritol poly(meth)acrylate (for example, produced by Nippon Kayaku Co., Ltd., KAYARAD® DPHA, or the like), and an epoxy (meth)acrylate which is a reaction product of a mono- or polyglycidyl compound and (meth)acrylic acid. Among these, an epoxy (meth)acrylate resin is the most suitably used.

The glycidyl compound used for the epoxy (meth)acrylate which is a reaction product of a mono- or polyglycidyl compound and (meth)acrylic acid is not particularly limited. Examples include bisphenol A, bisphenol F, bisphenol S, 4,4'-biphenylphenol, tetramethylbisphenol A, dimethylbisphenol A, tetramethylbisphenol F, dimethylbisphenol F, tetramethylbisphenol S, dimethylbisphenol S, tetramethyl-4,4'-biphenol, dimethyl-4,4'-biphenyl phenol, 1-(4-hydroxyphenyl)-2-[4-(1,1-bis-(4-hydroxyphenyl)ethyl) phenyl]propane, 2,2'-methylene-bis(4-methyl 6-tert-butylphenol), 4,4'-butylidene-bis(3-methyl 6-tert-butylphenol), tris (hydroxyphenyl)methane, resorcinol, hydroquinone, pyrogallol, and phenols having diisopropylidene skeletons; phenols such as 1,1-di-4-hydroxyphenylfluorene having fluorene skeletons; glycidyl etherified products of polyphenols such as phenolated polybutadiene, brominated bisphenol A, brominated bisphenol F, brominated bisphenol S, brominated phenol novolac, brominated cresol novolac, chlorinated bisphenol S, and chlorinated bisphenol A.

These epoxy (meth)acrylates which are reaction products of mono- or polyglycidyl compounds and (meth)acrylic acid can be obtained by subjecting epoxy groups thereof and equivalent amounts of (meth)acrylic acid to esterification reaction. This synthetic reaction can be performed by a commonly known method. For example, to resorcin diglycidyl ether is added (meth)acrylic acid in an amount equivalent thereto with a catalyst (for example, benzyldimethylamine, triethylamine, benzyltrimethylammonium chloride, triphenylphosphine, triphenylstibine, or the like) and a polymerization inhibitor (for example, methoquinone, hydroquinone, methylhydroquinone, phenothiazine, dibutylhydroxytoluene, or the like), and esterification reaction is performed at 80 to 110° C. The thus obtained (meth)acrylated resorcin diglycidyl ether is a resin having radical polymerizable (meth)acryloyl groups. A binder resin having both a polar functional group and two or more (meth)acryloyl groups in a molecule is particularly preferable.

It is particularly preferable that the resin having (meth)acryloyl groups be a binder resin having both a polar functional group and two or more (meth)acryloyl groups in a molecule. Examples of the polar functional group include a hydroxy group, a carboxyl group, a phospho group, an amino group, an imino group, a carbamoyl group, a cyano group, an isocyanate group, a nitro group, a nitroso group, a hydrazino group, a ureide group, a guanidino group, a sulfanyl group, a sulfino group, a sulfonic group, a furyl group, a thienyl group, a pyrrolyl group, a pyrrolidinyl group, a pyridyl group, a pyrrolidino group, a piperidinyl group, a morpholino group, and a quinolyl group. The polar functional group may be substituted with an alkyl group, an alkoxy group, or the like. A polar binding site different from substituents such as a urethane bond, an ether bond, and an ester bond (except the ester bond in a (meth)acryloyl group) is also included as the polar functional group.

Examples of the binder resin having both two or more (meth)acryloyl groups and a polar functional group include (meth)acrylate monomer compounds such as pentaerythritol triacrylate (KAYARAD® PET-30, produced by Nippon Kayaku Co., Ltd.), a mixture of dipentaerythritol pentaacrylate and dipentaerythritol hexaacrylate (KAYARAD® DPHA, produced by Nippon Kayaku Co., Ltd), 2-hydroxy-3-acryloyloxypropyl methacrylate (701A, produced by SHIN-NAKAMURA CHEMICAL Co., Ltd.), ethoxylated isocyanuric acid triacrylate (A-9300, produced by SHIN-NAKAMURA CHEMICAL Co., Ltd.), and c-caprolactone-modified tris(2-acryloxyethyl) isocyanurate (A-9300-1CL, produced by SHIN-NAKAMURA CHEMICAL Co., Ltd.); epoxy acrylate resins such as bisphenol A type epoxy acrylates (R-115 F, R-130, R-381, and the like, produced by Nippon Kayaku Co., Ltd.), and a bisphenol F type epoxy acrylate (ZFA-266H, produced by Nippon Kayaku Co., Ltd.), and acid-modified epoxy acrylates (the ZAR series, the ZFR series, the ZCR series, produced by Nippon Kayaku Co., Ltd.); and urethane acrylate resins such as polyester-based urethane acrylates (UX3204, UX-4101, UXT-6100, Produced by Nippon Kayaku Co., Ltd.), mixed urethane acrylates (UX-6101 and UX-8101, produced by Nippon Kayaku Co., Ltd.), polyether-based urethane acrylates (UX-937, UXF-4001-M35, produced by Nippon Kayaku Co., Ltd.), ester-based urethane acrylates (DPHA-40H, UX-5000, UX-5102D-M20, UX-5103D, and UX-5005, produced by Nippon Kayaku Co., Ltd.).

The ultraviolet curable resin is more preferably a binder resin having both 2 or more and 9 or less (meth)acryloyl groups and a polar functional group, and further preferably a binder resin having both 3 or more and 6 or less (meth)acryloyl groups and a polar functional group. When (meth)acryloyl groups, which are reactive groups, are 10 or more, the obtained cured product is too rigid, and the adhesive strength may be reduced.

It is preferable that the content of the ultraviolet curable resin in the block layer be 10% by mass or more and 99% by mass or less. The upper limit of the content of the ultraviolet curable resin is more preferably 95% by mass, further preferably 90% by mass, and particularly preferably 85% by mass. The lower limit of the content of the ultraviolet curable resin is more preferably 20% by mass, further preferably 50% by mass, and particularly preferably 75% by mass. That is, it is the most preferable that the content of the ultraviolet curable resin be 75% by mass or more and 85% by mass or less.

The block layer further contains a radical polymerization initiator, which cures the ultraviolet curable resin. The radical polymerization initiator means a photo-radical polymerization initiator and/or a heat radical polymerization initiator.

As long as the photo-radical polymerization initiator is a compound which produces radicals or an acid by irradiating ultraviolet rays, and starts a chain polymerization reaction, the photo-radical polymerization initiator is not particularly limited. The examples include benzyl dimethyl ketal, 1-hydroxycyclohexyl phenyl ketone, diethylthioxanthone, benzophenone, 2-ethylanthraquinone, 2-hydroxy-2-methylpropiophenone, 2-methyl[4-(methylthio)phenyl]-2-morpholino-1-propane, 2,4,6-trimethylbenzoyldiphenylphosphine oxide, camphorquinone, 9-fluorenone, and diphenyldisulfide. The specific examples include Irgacure® 651, 184, 2959, 127, 907, 369, 379 EG, 819, 784, 754, 500, OXE01, and OXE02, Darocur® 1173, Lucirin® TPO (all are produced by BASF SE), and SEIKUOL® Z, BZ, BEE, BIP, and BBI (all are produced by Seiko Chemical Co., Ltd.).

When the photo-radical polymerization initiator is used, it is preferable that the content thereof be 0.01 parts by mass or more and 10 parts by mass or less based on the total amount of 100 parts by mass of the ultraviolet curable resin. The upper limit of the content of the photo-radical polymerization initiator is more preferably 7 parts by mass, further preferably 5 parts by mass, and particularly preferably 4 parts by mass, and the most preferably 3 parts by mass. The lower limit of the photo-radical polymerization initiator is more preferably 0.01 parts by mass, further preferably 0.1 parts by mass, particularly preferably 1 part by mass, and the most preferably 1.5 parts by mass.

As long as the heat radical polymerization initiator is a compound which produces radicals by heating, and starts a chain polymerization reaction, the heat radical polymerization initiator is not particularly limited. The examples include organic peroxides, azo compounds, benzoin compounds, benzoin ether compounds, acetophenone compounds and benzopinacol, and benzopinacol are suitably used. As the organic peroxides, for example, Kayamek® A, M, R, L, LH, and SP-30C; Perkadox CH-50L and BC-FF; Cadox B-40ES; Perkadox 14; Trigonox® 22-70E, 23-C70, 121, 121-50E, 121-LS50E, 21-LS50E, 42, and 42LS; Kayaester® P-70, TMPO-70, CND-C70, 00-50E, and AN; Kayabutyl® B; Perkadox 16; and Kayacarbon® BIC-75 and AIC-75 (produced by Kayaku Akzo Corporation); PERMEK® N, H, S, F, D, and G; PERHEXA® H, HC, TMH, C, V, 22, and MC; PERCURE® AH, AL, and HB; PERBUTYL® H, C, ND, and L; PERCUMYL® H and D; PEROYL® IB and IPP; PEROCTA® ND (produced by NOF CORPORATION); and the like are available as commercial items. As the azo compounds, VA-044, V-070, VPE-0201, VSP-1001 (produced by FUJIFILM Wako Pure Chemical Corporation), and the like are available as commercial items.

When the heat radical polymerization initiator is used, it is preferable that the content thereof be 0.01 parts by mass or more and 10 parts by mass or less based on the total amount of 100 part by mass of the ultraviolet curable resin. The upper limit of the content of the heat radical polymerization initiator is preferably 7 parts by mass, further preferably 5 parts by mass, particularly preferably 4 parts by mass, and the most preferably 3 parts by mass. The lower limit of the heat radical polymerization initiator is preferably 0.01 parts by mass, further preferably 0.1 parts by mass, particularly preferably 1 part by mass, and the most preferably 1.5 parts by mass.

If needed, besides the above-mentioned components, other components including, for example, a leveling agent, an antifoaming agent, an ultraviolet ray absorbent, a light stabilizer, an antioxidant, a polymerization inhibitor, a cross-linking agent, a plasticizer, inorganic particulates, a filler, and the like can be added to the block layer, and this addition can also impart respective target functionalities. Examples of the leveling agent include fluorine-containing compounds, silicone-based compounds, and acrylic compounds. Examples of the ultraviolet ray absorbent include benzotriazole-based compounds, benzophenone-based compounds, and triazine-based compounds. Examples of the light stabilizer include hindered amine-based compounds and benzoate-based compounds.

Examples of the antioxidant include phenolic compounds. Examples of the polymerization inhibitor include methoquinone, methylhydroquinone, and hydroquinone. Examples of the crosslinking agent include polyisocyanates and melamine compounds. The amount of these components added can be suitably determined depending on the object.

It is preferable that the glass transition temperature (Tg) of the block layer be 80° C. or more and 300° C. or less, it is more preferable that the glass transition temperature be 90° C. or more and 200° C. or less, and it is further preferable that the glass transition temperature be 150° C. or more and 250° C. or less. The glass transition temperature can be measured, for example, by the DMA method under the following measurement conditions. The glass transition temperature is measured using a dynamic viscoelasticity measuring device (DMS-6100: manufactured by Hitachi High-Tech Science Corporation) in the tensile mode under the conditions of a frequency of 10 Hz and a temperature rise of 2° C./minute. The loss coefficient tan δ is obtained from the ratio of the loss modulus to the storage modulus (JIS:K 7244-1:1998). A temperature at which the obtained loss coefficient tan δ reaches the maximum is defined as the glass transition temperature.

It is preferable that the thickness of the block layer be 0.1 µm or more and 50 µm or less, it is more preferable that the thickness be 0.5 µm or more and 20 µm or less, and it is further preferable that the thickness be 1 µm or more and 10 µm or less. When the thickness of the block layer is 0.1 µm or more, the block layer has the effect of preventing a change in the phase difference value which the optical functional layer has by the entry of the plasticizer used as an intermediate film in the case where the optical film is applied to the optical laminate described below. When the thickness of the block layer is 50 µm or less, excellent appearance at the time of manufacturing the optical film and appearance at the time of manufacturing functional glass including the optical film are achieved. The block layer can be obtained by applying the resin composition for forming a block layer so that the film thickness after drying is in the above-mentioned preferable range, followed by drying and then curing by ultraviolet irradiation to form a cured film.

Examples of the method for applying a resin composition for forming a block layer include bar coater coating, meyer bar coating, air knife coating, gravure coating, reverse gravure coating, micro gravure coating, micro reverse gravure coater coating, die coater coating, dip coating, spin coat coating, and spray coating.

The block layer having the cured product of the resin composition containing (B-1) the thermoplastic resin and (B-2) the ultraviolet curable resin is excellent in adhesion to the intermediate film included in the optical laminate described below, and in durability. Especially, wrinkles are less likely to occur at the time of forming the block layer, and as to durability there is little change in polarized light conversion transmittance, a hue, and adhesion between before and after a heat resistance test.

Although the resin composition for forming a block layer is irradiated with ultraviolet rays for curing, an electron beam or the like can also be used. When the composition is cured by ultraviolet rays, an ultraviolet irradiation device having a xenon lamp, a high-pressure mercury lamp, a metal halide lamp, an LED, or the like as a light source can be used, and the amount of light, the disposition of a light source, and the like are adjusted if needed. When the high-pressure mercury lamp is used, it is preferable to cure the composition at a conveying speed of 5 to 60 m/minute per lamp having energy of 80 to 120 W/cm$^2$. Meanwhile, when the resin composition for forming a block layer is cured by an electron beam, it is preferable to use an electron beam accelerator having energy of 100 to 500 eV, and the photopolymerization initiator may not be used in the case.

[(C) Supporting Substrate]

When, in the optical film of the present disclosure, (B) the block layer is provided on only one surface of (A) the optical functional layer, it is preferable that the other surface of the optical functional layer be a film-like (C) supporting substrate. It is preferable that such a supporting substrate be transparent in a visible light region to maintain the visibility of a display image. The non-polarized light transmittance at a wavelength of 380 to 780 nm may be specifically 50% or more, it is preferable that the non-polarized light transmittance be 70% or more, and it is more preferable that the non-polarized light transmittance be 85% or more. Here, the non-polarized light transmittance means the transmittance of light which does not have regularity in the vibration of the light, namely the transmittance of natural light. Although the supporting substrate may be colored, it is preferable that the supporting substrate be not or hardly colored. Moreover, it is preferable that the refractive index of the supporting substrate be 1.2 to 2.0, and it is more preferable that the refractive index be 1.4 to 1.8. The thickness of the supporting substrate may be suitably selected depending on the use, is preferably 5 µm to 1000 µm, more preferably 10 µm to 250 µm, and is particularly preferably 15 µm to 150 µm.

(C) The supporting substrate may be a monolayer, or may be a laminate having two layers or more. Example of the supporting substrate include triacetylcellulose (TAC), acryl, polycarbonate, polyvinyl chloride, polyolefin, and polyethylene terephthalate (PET). Among these, triacetylcellulose (TAC), polyolefin, acryl, and the like, which have little birefringence, are preferable due to not changing the polarization axis of incident P polarized light or S polarized light.

[Method for Manufacturing Optical Film]

Thereafter, an example of methods for manufacturing optical films of the present disclosure will be described. As such a method, for example, a nematic liquid crystal monomer having polymerizable groups as a material for manufacturing the phase difference element forming the optical functional layer is dissolved in a solvent, and subsequently the photopolymerization initiator is added. As long as the liquid crystal monomer to be used can be dissolved in such a solvent, such a solvent is not particularly limited. The examples include cyclopentanone, toluene, methyl ethyl ketone, methyl isobutyl ketone, cyclopentanone, toluene, and the like are preferable. Then, this solution is applied to a plastic substrate such as a TAC film used as a supporting substrate so that the thickness is as uniform as possible, the solution is left to stand for a certain period of time under temperature conditions under which the solution becomes a liquid crystal, and is oriented on the plastic substrate while the solvent is removed by heating. At this time, the orientation of the liquid crystal can be more uniform by performing rubbing treatment in a desired direction before the coating of the plastic substrate surface or by performing the orientation treatment of forming a photo-oriented material, which exhibits photo-orientation by polarized light irradiation, into a film on the plastic substrate surface, irradiating polarized light, and the like. The slow axes of the phase difference elements such as ½ wavelength plates, ¼ wavelength plates, and circularly polarized light reflecting layers can be controlled to desired angles, and the haze values of the phase difference elements can be reduced thereby. Subsequently, the phase difference element having a desired slow axis can be obtained by irradiating the nematic liquid crystal monomer with ultraviolet rays using a high-pressure mercury lamp, or the like while this orientation state is maintained, and fixing the orientation of the liquid crystal.

When the configuration is a configuration in which the polymerizable liquid crystal monomer is applied directly to the supporting substrate subjected to orientation treatment as mentioned above, namely when the phase difference element forming the optical functional layer has the polymerizable liquid crystal layer provided on the supporting substrate subjected to orientation treatment, the supporting substrate has the function of preventing a decrease in the phase difference value of the phase difference element in the same way as the block layer. When the phase difference element has such a configuration, for example, a substance such as the intermediate film described below which can cause a change in the phase difference value does not contact the polymerizable liquid crystal layer of the phase difference element directly, so that a decrease in the phase difference value of the phase difference element can be suppressed. Since a manufacturing step of applying one block layer can be reduced, such a configuration enables manufacturing the optical laminate to be used for the present disclosure at a lower price as compared with a configuration in which block layers are provided on both surfaces of the optical functional layer.

<Optical Laminate>

In the optical laminate of the present disclosure, the intermediate film is laminated onto the above-mentioned optical film. It is preferable that the intermediate film be a resin film of a thermoplastic resin, and it is particularly preferable that the intermediate film be a film of polyvinyl butyral. Although the number of the intermediate film may be one or more, an optical laminate having a structure in which the optical film was clamped by two intermediate films is preferable.

Figure 4:
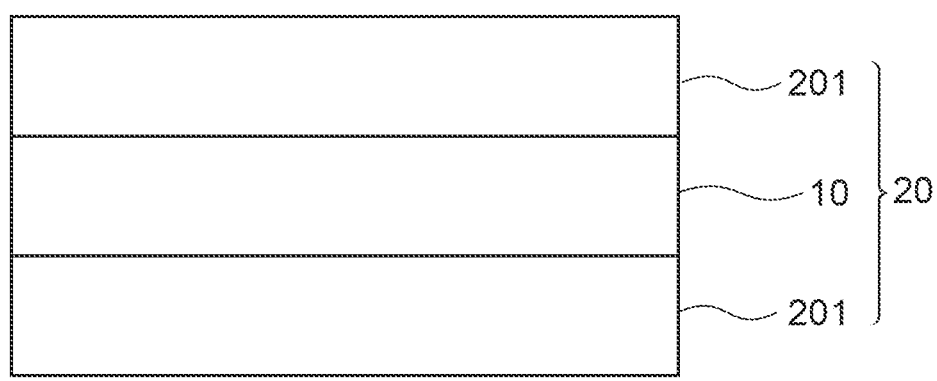
FIG. 4 is a side sectional view showing one embodiment of an optical laminate according to the present disclosure.

One embodiment of the optical laminate of the present disclosure is shown in FIG. 4, an optical laminate 20 has a configuration in which an optical film 10 is clamped by two intermediate films 201, and the optical film 10 corresponds to, for example, an optical film in FIG. 3. The optical film 10 may be in a configuration having a block layer on only a side on which a layer having the action of converting a polarization axis exists in an optical functional layer 101. In such a case, an intermediate film 201 may be formed on the block layer side, and another intermediate film 201 may be formed also on the supporting substrate side of a ½ wavelength plate.

<Intermediate Film>

As the intermediate film, a thermoplastic resin can be used. It is preferable that a commonly used intermediate film for automotive application can be used. Examples of such the intermediate film for automotive application include polyvinyl butyral-based resins (PVBs), polyvinyl alcohol resins (PVAs), ethylene-vinyl acetate copolymer-based resin (EVAs), or cycloolefin polymers (COPs). Intermediate films manufactured from these resins are preferable due to being versatile as intermediate films for laminated glass. As long as the reflection of display light is not affected at the time of applying the optical laminate to the HUD system described below, the thickness of the intermediate film is not particularly limited, and can be suitably designed depending on the use.

When the intermediate film for laminated glass is made of a PVB resin, phase difference elements such as a ½ wavelength plate, a ¼ wavelength plate, and a circularly polarized light reflecting layer including polymerizable liquid crystals contacting the intermediate film may deteriorate under a high temperature condition, and the phase difference value may decrease. It is considered that this results from the corrosion of the PVB resin itself adjoining the phase difference element and the influence of the plasticizer and the like contained in the PVB resin. Even though the intermediate film made of such a PVB resin or the intermediate film made of the PVB resin containing the plasticizer is laminated so as to contact the optical film directly in the optical laminate of the present disclosure, the deterioration of the phase difference elements such as a ½ wavelength plate, a ¼ wavelength plate, and a circularly polarized light reflecting layer is suppressed, and change in the phase difference values can be suppressed.

Examples of the plasticizer which reduce the phase difference value of the phase difference element including a polymerizable liquid crystal include organic ester plasticizers such as monobasic organic acid esters and polybasic organic acid esters; or organic phosphoric acid plasticizers such as organic phosphoric acids and organic phosphorous acids. Examples of the above-mentioned monobasic organic acid ester include glycol esters obtained by reacting glycols such as triethylene glycol, tetraethylene glycol, and tripropylene glycol with monobasic organic acids such as butyric acid, isobutyric acid, caproic acid, 2-ethylbutyric acid, heptylic acid, n-octylic acid, 2-ethylhexyl acid, pelargonic acid (n-nonylic acid), and decylic acid.

Examples of the above-mentioned polybasic organic acid ester include ester compounds of polybasic organic acids such as adipic acid, sebacic acid, and azelaic acid and alcohols having a linear or branched structure with 4 to 8 carbon atoms.

Examples of the above-mentioned organic ester plasticizer include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-2-ethylhexanoate, tetraethylene glycol di-n-heptanoate, dibutyl sebacate, dioctyl azelate, dibutylCarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol diheptanoate, tetraethylene glycol diheptanoate, dihexyl adipate, dioctyl adipate, hexyl cyclohexyl adipate, a mixture of heptyl adipate and nonyl adipate, diisononyl adipate, heptyl nonyl adipate, dibutyl sebacate, oil-modified alkyd sebacate, and a mixture of a phosphoric ester and an adipic ester.

Examples of the above-mentioned organic phosphoric acid plasticizer include tributoxyethyl phosphate, isodecyl phenyl phosphate, and triisopropyl phosphate.

An ultraviolet ray absorbent, an antioxidant, an antistatic agent, a heat stabilizer, a coloring agent, an adhesion control agent, and the like may be optionally added to the intermediate film for laminated glass, especially the intermediate film in which particulates which absorbs infrared rays are dispersed is important for manufacturing heat shielding glass with high performance. Particulates of materials such as metals of Sn, Ti, Zn, Fe, Al, Co, Ce, Cs, In, Ni, Ag, Cu, Pt, Mn, Ta, W, V, and Mo, metal oxides of the metals, metal nitrides of the metals, or complexes containing at least two or more thereof, which have conductivity, are used for particulates which absorb infrared rays. These materials may be doped with Sn, Sb, F, or the like. When laminated glass is used as windows for construction or cars required for transparency, especially tin-doped indium oxide (ITO), antimony-doped tin oxide (ATO), and fluorine-doped tin oxide, which is transparent in the visible light region, are preferable. It is preferable that the particle size of the particulates which absorb infrared rays and are dispersed in the intermediate film be 0.2 μm or less. If the particle size of the particulates is 0.2 μm or less, infrared rays can be absorbed while the scattering of light in the visible light region is suppressed, the physical properties such as adhesiveness, transparency, and durability are maintained equivalently to an unadded intermediate film without causing haze in laminated glass while the radio wave transmittance and the transparency are secured, and treatment for forming laminated glass can moreover be performed in operation in a common line for manufacturing laminated glass. When PVB is used for the intermediate film, lamination treatment is performed in a room at constant temperature and constant humidity to maintain the moisture content of the intermediate film optimally. An intermediate film, a part of which is colored, an intermediate film in which a layer having a sound insulation function is sandwiched, an intermediate film in which the thickness is oblique (wedge shape) to reduce a ghost phenomenon (double reflection) in the HUD, or the like can be used for the intermediate film.

Although the method for laminating an intermediate film for laminated glass with an optical film having an optical functional layer such as a ½ wavelength plate or a ¼ wavelength plate is not particularly limited, examples include a method for laminating an intermediate film with an optical film by press-fitting simultaneously using a nip roll. When the nip roll can be heated at the time of lamination, the intermediate film and the optical film can be press-fit during heating. When the adhesion between the intermediate film and the optical film is inferior, the lamination may be performed after surface treatment by corona treatment, plasma treatment, or the like is performed beforehand.

The intermediate film may be directly layered on one surface or both surfaces of the optical film with the intermediate film dissolved in a solvent. When a polyvinyl butyral-based resin (PVB) is used as the intermediate film, it is preferable that the degree of butyralation be 40% by mol or more and 85% by mol or less, it is more preferable that the lower limit value of the degree of butyralation be 55% by mol, and it is particularly preferable that the lower limit value be 60% by mol. Meanwhile, it is more preferable that the upper limit value of the degree of butyralation be 80% by mol, and it is particularly preferable that the upper limit value be 75% by mol. The degree of butyralation can be measured by an infrared absorption spectrum (IR) method, and for example, can be measured using an FT-IR.

It is preferable that the amount of the hydroxyl groups of the polyvinyl butyral-based resin be 15% by mol or more and 35% by mol or less. When the amount of the hydroxyl groups is less than 15% by mol, the adhesiveness between the intermediate film for laminated glass and glass may decrease, or the penetration resistance of the laminated glass may decrease. Meanwhile, when the amount of hydroxyl groups exceeds 35% by mol, the intermediate film may be hard.

The polyvinyl butyral-based resin can be prepared by acetalizing polyvinyl alcohol with an aldehyde. Polyvinyl alcohol is usually obtained by saponifying polyvinyl acetate, and polyvinyl alcohol having a saponification degree of 80 to 99.8% by mol is generally used. It is preferable that the polymerization degree of polyvinyl alcohol be 4000 or less, it is more preferable that the polymerization degree be 3000 or less, and it is particularly preferable that the polymerization degree be 2500 or less. When the polymerization degree exceeds 4000, the manufacturing of the intermediate film may be difficult.

<Functional Glass>

The functional glass of the present disclosure includes the above-mentioned optical laminate and a glass plate. Although the glass plate may be one or more, functional glass having a structure in which the optical laminate is clamped with two glass plates is preferable. Such functional glass is suitably used as a display medium in the HUD system.

The functional glass is manufactured, for example, by bonding the above-mentioned optical laminate onto the glass plate.

As one example of the method for bonding an optical laminate onto a glass plate, the functional glass can be obtained by applying a pressure sensitive adhesive or an adhesive to one side or both sides of the optical laminate and subsequently bonding the glass plate or the glass plates. Although the pressure sensitive adhesive or the adhesive is not particularly limited, when the removal may be performed, a material which is excellent in reworkability, and has good adhesiveness, for example, a silicone pressure sensitive adhesive, an acrylic pressure sensitive adhesive, or the like, is preferable.

For example, even though the functional glass of the present disclosure is used as a windshield, the glass plate is not particularly limited in the case where the functional glass has transparency wherein the scene ahead can be fully confirmed visually. It is preferable that the refractive index of the glass plate be 1.2 to 2.0, and it is more preferable that the refractive index be 1.4 to 1.8. As long as the thickness, shape, and the like of the glass plate do not affect the reflection of display light in the case where the functional glass is applied to the HUD system described below, they are not particularly limited and can be suitably designed depending on the use. A reflection increasing film including a multilayer film, a metal thin film also having a heat shielding function, and the like may be provided on the reflective surface on the glass plate. These films can improve the reflectance of incident polarized light. For example, when the functional glass of the present disclosure is used as a windshield for cars, it is preferable to adjust the reflectance so that the visible light transmittance of the functional glass is 70% or more.

Figure 5:
FIG. 5 is a side sectional view showing one embodiment of a functional glass according to the present disclosure.

When the optical laminate of the present disclosure is used, functional glass in which an optical laminate is disposed in glass can be obtained by disposing the optical laminate between two glass plates for press-fitting at high temperature and high pressure. FIG. 5 shows one embodiment of the functional glass according to the present disclosure. Functional glass 30 shown in FIG. 5 has a configuration in which an optical laminate 20 is clamped with two glass plates 301, and for example, the optical laminate 20 corresponds to the optical laminate in FIG. 4. As shown in FIG. 3, an optical film 10 forming the optical laminate 20 has a block layer 102 in one surface of an optical functional layer 101, and the other surface may be a supporting substrate (not shown), or the optical film 10 may have block layers 102 on both surfaces of the optical functional layer 101. As shown in FIG. 5, when the optical laminate 20 forms the functional glass 30, intermediate films 201 also has a function as a pressure sensitive adhesive or an adhesive for maintaining the adhesion between the two glass plates 301 and the optical laminate 20.

An example of the method of manufacturing functional glass using the optical film of the present disclosure will be described specifically. First, two glass plates are provided. When the glass plates are used as laminated glass for a windshield for a car, soda-lime glass made by the floating method is used.

The glass may be either transparent glass and green-colored glass, and is not particularly limited. As to the thickness of these glass plates, around 2 mmt is usually employed; however, glass plates having a thickness a little thinner than this can also be used in response to requests for the weight reduction of glass in recent years. Glass plates are cut out in a predetermined shape, and the glass edges are chamfered off and washed. When a black print in a frame shape or a dot shape is required, this is printed on the glass plates. When a curved surface shape like a windshield is needed, the glass plates are heated at 650° C. or more and then faired by pressing with a mold, bending by self weight, or the like so that the two sheets may be in the same surface shape, and the glass is cooled. When the cooling rate is too high at this time, stress distribution occurs in the glass plates, the glass plates become tempered glass, and the glass plates are therefore slowly cooled. One of the thus manufactured glass plates is placed horizontally, and an optical film of the present disclosure is laid thereon, and the other glass plate is further placed. Alternatively, the method may be a method for laying an intermediate film, an optical film, and an intermediate film on a glass plate sequentially, and finally placing the other glass plate. At this time, in the optical film, a phase difference element as an optical functional layer is disposed so as to be on the outer side of the car. Subsequently, the optical film and the intermediate films protruded from the edges of the glass plates are cut and removed with a cutter. Then, heating is performed at a temperature of 80° C. to 100° C. while air existing between the glass plates, the intermediate films, and the optical film laminated in the shape of a sandwich is deaerated, and preliminary adhesion is performed. As methods for deaerating air, there are two types of the bag method, which are performed by wrapping the laminate of glass plate/intermediate film/optical film/intermediate film/glass plate in a rubber bag made of heat-resistant rubber or the like, and the ring method, in which sealing is performed by covering only the end portion of the glass with a rubber ring, and either may be used. After the completion of the preliminary adhesion, the laminate of glass plate/intermediate film/optical film/intermediate film/glass plate taken out of the rubber bag or the laminate from which the rubber ring is removed is placed in an autoclave, heated to 120° C. to 150° C. under a high pressure of 10 to 15 kg/cm$^2$, and subjected to heating and pressurization treatment for 20 minutes to 40 minutes under these conditions. After the treatment, the laminate is cooled to 50° C. or less and then decompressed. Functional glass of the present disclosure including glass/intermediate film/optical film/intermediate film/glass is taken out of the autoclave.

Although, in the above-mentioned embodiment, the intermediate film is disposed between the glass plate and the optical film as one independent film, the intermediate film may be disposed in a state in which the intermediate film is laminated directly to the optical film beforehand, namely in the state of an optical laminate, instead thereof. An optical laminate in which at least one intermediate film of the two intermediate films is laminated directly to the optical film beforehand may be specifically used. A step of disposing an intermediate film between the optical film and a glass plate can be omitted, so that the manufacturing cost can be reduced using such an intermediate film.

The thus obtained functional glass can be used as windshields, side glasses, rear glasses, and roof glasses for standard-sized cars, small cars, light cars, and the like as well as a large-sized special cars and small special cars. Moreover, the functional glass can be used as windows for railcars, vessels, airplanes and as window materials for building materials and industrial uses. As a form of use, the functional glass can be used with the functional glass laminated onto or bonded onto members having a UV-blocking or a light control function.

<Head-Up Display System>

Figure 1:
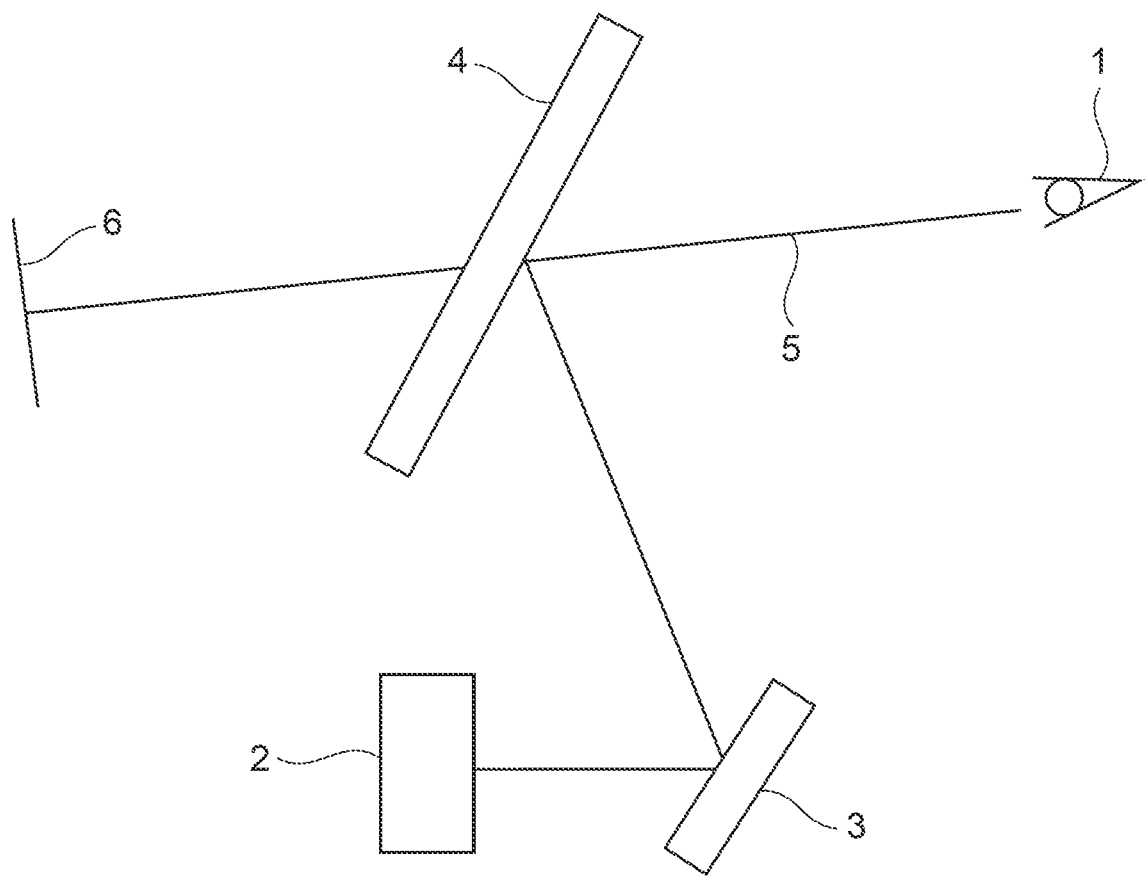
FIG. 1 is a schematic diagram showing one embodiment of a head-up display system according to the present disclosure.

Since the optical film of the present disclosure is excellent also in adhesion and appearance when the laminated glass is formed using the optical film, the optical film is suitable for a head-up display system. One embodiment of the HUD system of the present disclosure is shown in FIG. 1. The HUD system shown in FIG. 1 includes a display 2 which converts display light that shows a display image into P polarized light and emits the P polarized light, a reflecting mirror 3 which reflects the display light emitted from the display 2, and functional glass 4 of the present disclosure in which the P polarized light or S polarized light emitted from the display 2 comes. The P polarized light or the S polarized light reaches an observer 1 through an optical path 5 by reflecting the P polarized light or the S polarized light emitted from the display 2 on the reflecting mirror 3 and irradiating the functional glass 4 of the present disclosure which functions as a windshield with this reflected display light, and a display image 6 can be visually confirmed as a virtual image. Although, in the HUD system shown in FIG. 1, the display light emitted from the display 2 comes into the functional glass 4 through the reflecting mirror 3, the display light may come into the functional glass 4 directly from the display 2.

<Display>

Figure 2:
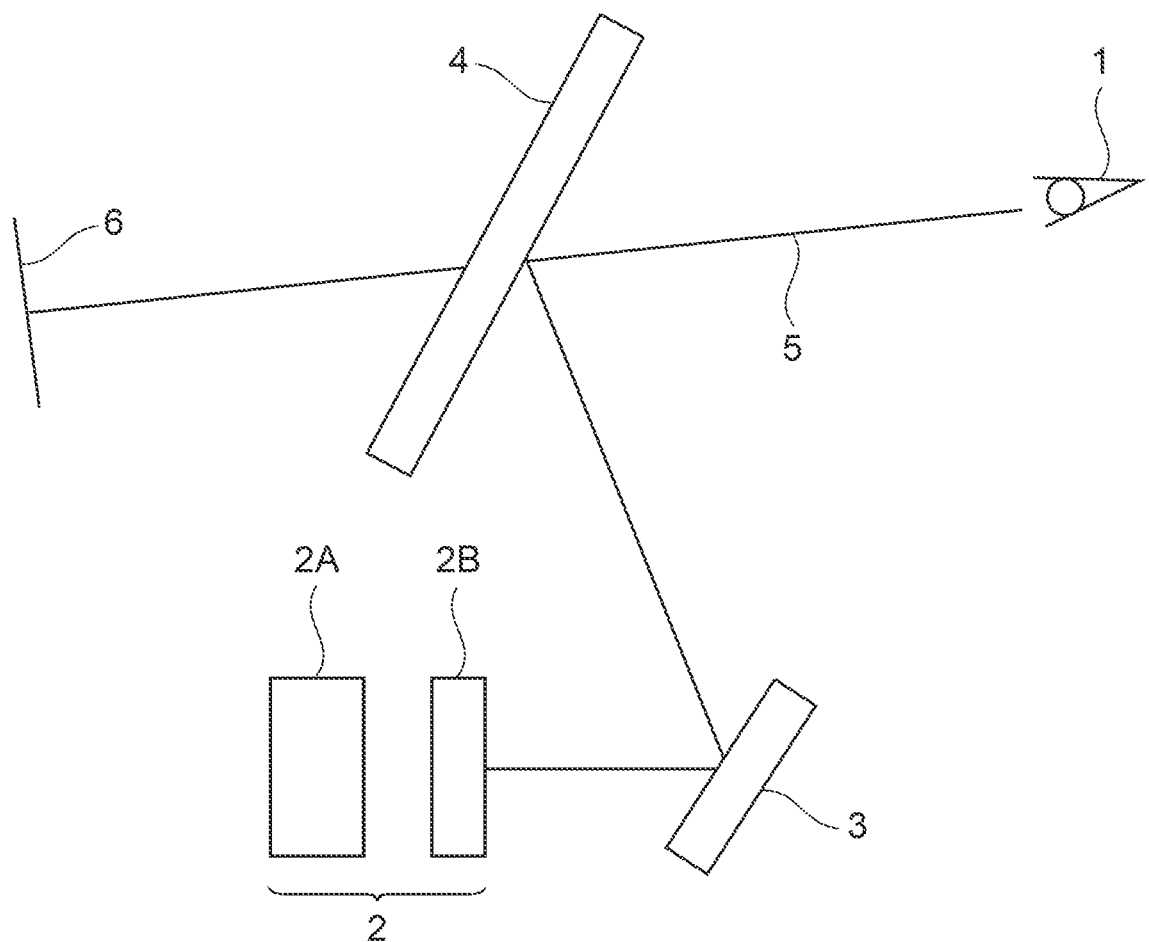
FIG. 2 is a schematic diagram showing another embodiment of a head-up display system according to the present disclosure.

As long as the display 2 can emit desired P polarized light or S polarized light until the desired P polarized light or S polarized light finally reaches the functional glass 4, the display 2 is not particularly limited. The examples include liquid crystal displays (LCDs) and organic EL displays (OELDs). When the display 2 is a liquid crystal display, emission light is usually linear polarized light, and can therefore be used as it is. Meanwhile, when the display 2 is an organic EL display, for example, as shown in FIG. 2, the display 2 may includes a light source 2A and a polarizing plate 2B which can emit P polarized light or S polarized light. When the HUD system is used for a car, optical members such as a polarizing plate and a ½ wavelength plate are disposed on a light-emitting opening such as a dashboard, and the liquid crystal display and the organic EL display can also be adjusted so that P polarized light or S polarized light can be emitted from the display 2. The light source used for the display 2 is not particularly limited, and the light source such as a laser light source, an LED source, or the like can be used. The display image can be clarified more effectively by setting the central reflection wavelength of a phase difference element forming the optical functional layer so that the central reflection wavelength corresponds to the emission spectrum of the above-mentioned light source.

In the HUD system of the present disclosure, when display light emitted from the display 2 is P polarized light, and the Brewster angle of the P polarized light to the functional glass is further defined as α, it is preferable that the incidence angle of the P polarized light which come into functional glass 4 be in the range of α−10° or more and α+10° or less. That is, the reflection of the P polarized light on the glass plate surface of the functional glass 4 is sharply reduced by making the P polarized light from the display 2 come in the functional glass 4 at an incidence angle near the Brewster angle. When, in the optical laminate forming the functional glass 4, the optical film having a ½ wavelength plate as the optical functional layer is used, P polarized light transmitted through the glass plate is converted into S polarized light with the ½ wavelength plate forming an optical functional layer, and the converted S polarized light is reflected on the interface of the other glass plate. The reflected S polarized light is converted into P polarized light again with the ½ wavelength plate, and this P polarized light reaches the observer. The display image can be visually confirmed as a virtual image by the observer thereby. Meanwhile, the incidence angle of the P polarized light is less than α−10° or more than α+10°, the incidence angle of the P polarized light is out of the neighborhood of the Brewster angle, the reflectance of the P polarized light may increase, and a double image may be formed. Thus, the formation of the double image can be reduced sharply by adjusting the incidence angle of P polarized light to the neighborhood of the Brewster angle. Since reflected light from the road surface is generally S polarized light, the observer may use polarization sunglasses. Since the polarization sunglasses are designed to absorb S polarized light, in a conventional HUD system using S polarized light, the visibility of the display image in the HUD through polarization sunglasses decreases extremely. Meanwhile, in the case of the HUD system in which P polarized light reaches the observer and which uses P polarized light, the formation of a double image can be suppressed, and the visibility of the display image can be enhanced also when the polarization sunglasses are worn.

<Reflecting Mirror>

The HUD system of the present disclosure may include a reflecting mirror if needed. As long as the reflecting mirror can reflect display light from the display toward the optical laminate, the reflecting mirror is not particularly limited. For example, the reflecting mirror includes a plane mirror, a concave mirror, or the like. When a concave mirror is used as the reflecting mirror, the concave mirror can also magnify the display light from the display at a predetermined magnifying power.

EXAMPLES

Hereinafter, the present disclosure will be described in detail with Examples. As long as the present disclosure does not exceed the gist, the present disclosure is not limited to the following Examples. In the Examples, "part" means part by mass.

Example 1

<Preparation of Coating Liquid (Liquid Crystal Composition)>

A coating liquid A, which has a composition shown in Table 1, was prepared.

TABLE 1

| <Preparation of the ultraviolet curable resin coating liquid for block layer formation> | | |
|---|---|---|
| Material (type) | Material name (maker) | Prescribed amount (part) |
| Polymerizable liquid crystal | LC242 (BASF SE) | 25.0 |
| Photopolymerization initiator | Irgacure907 (BASF SE) | 1.0 |
| Solvent | Toluene | 74.0 |

A coating liquid B, which is an ultraviolet curable resin composition (resin composition for forming a block layer) having a composition shown in Table 2, was prepared.

TABLE 2

| Material (type) | Material name (maker) | Prescribed amount (part) |
|---|---|---|
| (B-2) Ultraviolet curable resin | PET30 (Nippon Kayaku Co., Ltd.) | 25.7 |
| (B-1) Thermoplastic resin | KS-10 (SEKISUI CHEMICAL CO., LTD.) | 2.9 |
| Photopolymerization initiator | Irgacure907 (BASF SE) | 1.5 |
| Solvent | Methyl ethyl ketone | 70.0 |

<Manufacturing of Optical Film>

An optical film was manufactured in the following procedure using the prepared coating liquid A. A TAC film (having a thickness of 80 μm) subjected to rubbing treatment beforehand in the method described in Example 1 in Japanese Patent Application Publication No. 2002-90743 was used for a plastic substrate as a supporting substrate.

(1) The coating liquid A was applied to the rubbing-treated surface of the TAC film at room temperature using a wire bar so that the thickness of a ½ wavelength plate as an optical functional layer obtained after drying was 1 μm.

(2) The obtained coating film was heated at 50° C. for 2 minutes, and the solvent was removed to form a liquid crystal phase. Subsequently, UV irradiation was performed with a high-pressure mercury lamp (manufactured by HARISON TOSHIBA LIGHTING CORPORATION) at a generating power of 120 W for 5 to 10 seconds, the liquid crystal phase was fixed to manufacture a ½ wavelength plate in which the polymerizable liquid crystal layer was layered on the TAC film.

(3) The coating liquid B, which is a resin composition for forming a block layer, was applied to the polymerizable liquid crystal layer side of the ½ wavelength plate at room temperature using the wire bar so that the thickness of the block layer obtained after drying was 3.0 μm.

(4) The obtained coating film was heated at 80° C. for 1 minute to remove the solvent. Subsequently, UV irradiation was performed with a high-pressure mercury lamp (manufactured by HARISON TOSHIBA LIGHTING Corporation) at a generating power of 120 W for 5 to 10 seconds, and a block layer was layered on the polymerizable liquid crystal layer side of the ½ wavelength plate. An optical film which had the block layer on one surface of the ½ wavelength plate and in which the other surface of the ½ wavelength plate was a supporting substrate (TAC film) was thus manufactured. The obtained optical film was placed between polarizing plates disposed parallelly, the transmittance at the time of polarization conversion was measured with an "ultraviolet, visible, and near-infrared spectrophotometer UV-3600" manufactured by SHIMADZU CORPORATION, and the wavelength at which the transmittance was minimum, namely the wavelength at which polarization conversion (performance) was maximum was measured. As a result of the measurement, the wavelength at which the polarization conversion (performance) of the optical film was maximum was 545 nm.

<Manufacturing of Optical Laminate>

Two transparent intermediate films made of a polyvinyl butyral resin, having a thickness of 0.38 mm, and containing triethylene glycol di-2-ethylhexanoate as a plasticizer were used. The manufactured optical film was disposed between the intermediate films which were polyvinyl butyral films. Subsequently, the optical film and the two intermediate films were pressurized and press-fit with a laminator to manufacture an optical laminate.

<Manufacturing of Functional Glass>

The manufactured optical laminate was disposed between two glass plates each having a thickness of 2 mm, and pressurization and heating are subsequently performed by the following method to manufacture functional glass.

First, the manufactured optical laminate and a transparent glass plate were laid on a transparent glass plate sequentially. Thereafter, extra portions of the optical laminate protruding from the edge portions of the glass plates were cut and removed. This was wrapped in a rubber bag, deaerated in an autoclave heated at 90° C. for 10 minutes, and subjected to preliminary adhesion. The preliminarily press-fit optical laminate was cooled to room temperature, and this was subsequently taken out of the rubber bag, and heated and pressurized in the autoclave at 135° C. under a high pressure of 12 kg/cm² for 30 minutes again. Functional glass having good appearance was thus manufactured. When, as to the manufactured functional glass, the total light transmittance was measured, the total light transmittance was measured is 89.5%, and excellent transmittance was exhibited. The total light transmittance was measured using the fully automatic hazemeter "TC-HIIIDPK" manufactured by TokyoDenshoku.co., Ltd. in accordance with a JIS standard K7105.

Examples 2 to 8 and Comparative Examples 1 to 3

Optical films, optical laminates, and functional glass according to Examples 2 to 8 and Comparative Examples 1 to 3 were manufactured in the same way as in Example 1 except that (B-1) the thermoplastic resin in Table 2 was changed into thermoplastic resins shown in Table 3. Comparative Example 1 has no block layer, and Comparative Examples 2 and 3 have configurations having no thermoplastic resin in the block layers. When, as to the functional glass of Comparative Example 3, the total light transmittance was measured in the same way as in Example 1, the total light transmittance was 88.5%.

The characteristics of the optical films and the functional glasses according to Examples 1 to 8 and Comparative Examples 1 to 3 were measured and evaluated as follows.

<Wavelength Shift Amount by Autoclave Processing>

The minimum wavelength in polarization conversion when functional glass was manufactured from an optical film was measured, and the difference therebetween was calculated as the wavelength shift amount by autoclave processing S1 (nm). The results were as shown in Table 3. The wavelength shift amount by autoclave processing S1 (nm) is a value calculated by the following.

$S1$=polarization conversion minimum wavelength of functional glass (nm)−polarization conversion minimum wavelength of optical film (nm)  [Expression 3]

<Heat Resistance Evaluation>

The functional glasses obtained by the Examples and the Comparative Examples were left to stand in a high temperature atmosphere of 120° C. for 1200 hours, and the respective wavelength shifts before and after each of the functional glasses were left to stand were measured. The results were as shown in Table 3. The wavelength shift amount by the durability test, which shows the degree of change in the phase difference value, S2 (nm) is a value calculated by the following.

$S2$=wavelength of functional glass after functional glass is left to stand (nm)−wavelength of functional glass before functional glass is left to stand (nm)  [Expression 4]

<Hue Change (ΔE)>

Specimens for optical film measurement according to Examples 1 to 8 and Comparative Examples 1 to 3 with a size of 50 mm×50 mm in the C regions were cut out. Using the spectrocolorimeter CM-3600A manufactured by KONICA MINOLTA, INC, each specimen was set so that the normal line of the film plane corresponds with incident light, and the chromaticity a*, the chromaticity b*, and the brightness L* of transmitted light at any place of the specimen were measured under a condition of a target mask having a measurement diameter of 8 mm. The specimen was then moved so that another measurement place was 20 mm or more away from the center of the measurement place, and the same measurement was repeated 4 times. The average values of the chromaticity a*, the chromaticity b*, and the brightness L* in the C region in the 5 measurements are defined as a*C, b*C, and L*C, respectively. The same measurements were performed on the E region, and the average values of the chromaticity a*, the chromaticity b*, and the brightness L* in the E region in the 5 measurements are defined as a*E, b*E, and L*E, respectively. The hue change ΔE was calculated using expressions (V) to (VIII) by the combination of the chromaticity a*, the chromaticity b*, and the brightness L*. The obtained results of the hue change ΔE were as shown in Table 3. The hue change test was performed under the conditions of 100° C.-dry for 1200 hours using a heat resistance accelerating tester.

$$\Delta L^* = L^*C - L^*E \quad (V)$$

$$\Delta a^* = a^*C - a^*E \quad (VI)$$

$$\Delta b^* = b^*C - b^*E \quad (VII)$$

$$\Delta E = ((\Delta L^*)^2 + (\Delta a^*)^2 + (\Delta b^*)^2)^{1/2} \quad (VIII)$$

<Measurement of Haze>

The functional glass was measured and evaluated with a haze meter. The results were as shown in Table 3.

<Adhesion>

The adhesion was evaluated by the pummel test. Specifically, functional glass was left to stand in a freezer at a temperature of −18° C.±0.6° C. for 16 hours, the central portion (portion having a length of 150 mm×a width of 150 mm) of functional glass was then struck with a hammer having a head which was 0.45 kg. The functional glass was smashed down to a glass particle size of 6 mm or less. The degree of exposure of the block layer after the glass was partially exfoliated was determined in terms of the pummel value. The functional glass was evaluated from the found pummel value by the following standard, and it is determined that "fair" or better comes up to the standard. The results were as shown in Table 3.

Good: There is no peeling.
Fair: Although there is no peeling after hammer strikes, glass can be peeled in an attempt to peel the glass by hand.
Poor: There is peeling after hammer strikes.

<Optical distortion>

It is visually estimated whether there is optical distortion when images were observed through functional glass and when light was reflected on the functional glass or not. When distortion was not observed in the images, the functional glass was evaluated as "good". When a little distortion was observed in the images, the functional glass was evaluated as "fair". When distortion was observed in the images, the functional glass was evaluated as "poor". It is determined that "fair" or better comes up to the standard. The results were as shown in Table 3.

temperature atmosphere were inferior. In the adhesion test, peeling was also observed between the block layer and the PVB layer.

Also, the functional glasses manufactured in Comparative Examples 2 and 3, which had no thermoplastic resin in the block layers, exhibited large wavelength shifts at the time of autoclave processing S1 land large wavelength shift amounts by the durability tests S2, and the durability and the optical performance in a high temperature atmosphere were inferior. Distortions were observed in the images also in the optical distortion evaluation.

Thus, an optical film wherein only the reflectance of specific polarized light is effectively improved by the present disclosure while high visible light transmittance is maintained, the durability is high, and a change in the phase difference value can be suppressed over a long period of time, an optical laminate, functional glass, and a head-up display system using the optical film can be provided by the present disclosure. Since a block layer used for the optical film of the present disclosure enables easy lamination to an

TABLE 3

| | (B-1) Thermplastic resin | | | (B-2) Ultraviolet curable resin Type | Wavelength shift amount S1 [nm] | Wavelength shift amount S2 [nm] | Hue change ΔE | Haze [%] | Adhesion | Optical distortion |
|---|---|---|---|---|---|---|---|---|---|---|
| | Type | Molecular weight ×10⁴ | Tg [° C.] | | | | | | | |
| Example 1 | KS-10 | 1.7 | 106 | PET30 | −29.0 | −14.5 | 1.09 | 0.4 | Good | Good |
| Example 2 | BL-1 | 1.9 | 66 | PET30 | −30.5 | −18.5 | 1.41 | 0.8 | Good | Good |
| Example 3 | BM-S | 5.3 | 60 | PET30 | −30.0 | −13.0 | 1.35 | 0.6 | Good | Good |
| Example 4 | BL-S | 2.3 | 61 | PET30 | −24.5 | −17.5 | 1.56 | 0.5 | Good | Good |
| Example 5 | MD-1480 | 1.5 | 20 | PET30 | −29.0 | −19.5 | 1.11 | 0.3 | Good | Good |
| Example 6 | MD-2000 | 1.8 | 67 | PET30 | −24.0 | −13.0 | 1.58 | 0.5 | Fair | Fair |
| Example 7 | UR-1700 | 1.6 | 92 | PET30 | −36.5 | −13.5 | 1.20 | 0.4 | Fair | Good |
| Example 8 | LIR-403 | 3.4 | −60 | PET30 | −28.0 | −16.5 | 1.44 | 0.4 | Good | Fair |
| Comparative Example 1 | — | — | — | — | −59.5 | −22.0 | 1.16 | 0.4 | Poor | Good |
| Comparative Example 2 | — | — | — | PET30 | −36.0 | −20.0 | 1.25 | 0.3 | Fair | Poor |
| Comparative Example 3 | — | — | — | PET30 + UX − 4101 | −30.0 | −25.5 | 1.63 | 0.6 | Good | Poor |

KS-10: Polyvinyl acetoacetal resin (produced by SEKISUI CHEMICAL CO., LTD., product name "S-LEC KS-10")
BL-1: Polyvinyl butyral resin (produced by SEKISUI CHEMICAL CO., LTD., product name "S-LEC BL-1")
BM-S: Polyvinyl butyral resin (produced by SEKISUI CHEMICAL CO., LTD., product name "S-LEC BM-S")
BL-S: Polyvinyl butyral resin (produced by SEKISUI CHEMICAL CO., LTD., product name "S-LEC BL-S")
MD-1480: Polyester resin (produced by TOYOBO CO., LTD., product name "VYLONAL MD-1480")
MD-2000: Polyester resin (produced by TOYOBO CO., LTD., product name "VYLONAL MD-2000")
UR-1700: Polyester urethane resin (produced by TOYOBO CO., LTD., product name "VYLON UR1700")
LIR-403: Isoprene resin (produced by Kuraray Co., Ltd., product name "KURAPRENE LIR-403")
PET30: Pentaerythritol triacrylate (produced by Nippon Kayaku Co., Ltd., product name "KAYARAD PET30")
UX-4101: Urethane resin (produced by Nippon Kayaku Co., Ltd., product name "KAYARAD UX-4101")

From Table 3, all the functional glasses manufactured in Examples 1 to 8, which had a block layer containing a thermoplastic resin, exhibited characteristics excellent in the wavelength shift at the time of autoclave processing S1, the wavelength shift amount by the durability test S2, and the hue change ΔE as compared with the functional glasses manufactured in Comparative Examples 1 to 3. In Examples 1 to 8, the optical films wherein the durability was high, and change in the phase difference values of the phase difference elements could be suppressed in a high temperature atmosphere over a long period of time could therefore be provided.

Meanwhile, the functional glass manufactured in Comparative Example 1, which had no block layer, exhibited large wavelength shifts at the time of autoclave processing S1 and large wavelength shift amounts by a durability test S2, and the durability and the optical performance in a high optical laminate such as the above-mentioned phase difference element, and is also excellent in workability, the block layer is useful.

What is claimed is:

1. An optical film, comprising (A) an optical functional layer and (B) a block layer, wherein (B) the block layer has a cured product of a resin composition including (B-1) a thermoplastic resin and (B-2) an ultraviolet curable resin.

2. The optical film according to claim 1, wherein (B-1) the thermoplastic resin is a polyvinyl acetal resin.

3. The optical film according to claim 1, wherein (B-1) the thermoplastic resin is a thermoplastic resin having a molecular weight of 10,000 or more and 60,000 or less.

4. The optical film according to claim 1, wherein (B-1) the thermoplastic resin is a polyvinyl acetoacetal resin.

5. The optical film according to claim 1, wherein a content of (B-1) the thermoplastic resin in the block layer is 1% by mass or more and 80% by mass or less.

6. The optical film according to claim 1, wherein (B-2) the ultraviolet curable resin is a resin having a (meth)acryloyl group.

7. The optical film according to claim 6, wherein the resin having a (meth)acryloyl group is an epoxy (meth)acrylate resin.

8. The optical film according to claim 1, wherein a glass transition temperature of (B) the block layer is 80° C. or more and 300° C. or less.

9. The optical film according to claim 1, wherein (A) the optical functional layer is any of the following (A-1) to (A-4):
  (A-1) a ½ wavelength plate,
  (A-2) a ¼ wavelength plate,
  (A-3) a laminate of a ½ wavelength plate and a circularly polarized light reflecting layer, and
  (A-4) a laminate of a ¼ wavelength plate and a circularly polarized light reflecting layer.

10. The optical film according to claim 9, wherein the ½ wavelength plate or the ¼ wavelength plate includes a polymerizable liquid crystal layer as a layer having an action of converting a polarization axis.

11. The optical film according to claim 1, further comprising (C) a supporting substrate.

12. An optical laminate, wherein an intermediate film is laminated onto the optical film according to claim 1.

13. Functional glass, comprising the optical laminate according to claim 12 and a glass plate.

14. A head-up display system, comprising: the optical film, the optical laminate, and the functional glass according to claim 13; and image display units for emitting display light that shows an image display.

* * * * *